United States Patent
Park et al.

(10) Patent No.: US 10,075,666 B2
(45) Date of Patent: *Sep. 11, 2018

(54) METHOD OF ACQUIRING INFORMATION ABOUT CONTENTS, IMAGE DISPLAY APPARATUS USING THE METHOD, AND SERVER SYSTEM FOR PROVIDING INFORMATION ABOUT CONTENTS

(71) Applicant: Samsung Electronics Co., Ltd., Suwon-si (KR)

(72) Inventors: Gyu-tae Park, Seoul (KR); Hak-sup Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/616,093

(22) Filed: Jun. 7, 2017

(65) Prior Publication Data

US 2017/0272683 A1 Sep. 21, 2017

Related U.S. Application Data

(63) Continuation of application No. 14/452,092, filed on Aug. 5, 2014, now Pat. No. 9,706,154.

(30) Foreign Application Priority Data

Aug. 6, 2013 (KR) .......................... 10-2013-0093340

(51) Int. Cl.
*H04N 7/173* (2011.01)
*H04N 5/445* (2011.01)
(Continued)

(52) U.S. Cl.
CPC ... *H04N 5/44504* (2013.01); *G06F 17/30253* (2013.01); *G06K 9/3266* (2013.01);
(Continued)

(58) Field of Classification Search
USPC ....................................................... 725/9–21
See application file for complete search history.

(56) References Cited

U.S. PATENT DOCUMENTS 9,578,272 B2 2/2017 Kim et al.
2008/0127262 A1 5/2008 Neufeld
(Continued)

FOREIGN PATENT DOCUMENTS

| CN | 1735162 | 2/2006 |
| CN | 102447964 | 5/2012 |

(Continued)

OTHER PUBLICATIONS

International Search Report and Written Opinion of International Search Report dated Nov. 18, 2014 from International Patent Application No. PCT/KR2014/007234, 10 pages.
(Continued)

*Primary Examiner* — Fernando Alcon
(74) *Attorney, Agent, or Firm* — Staas & Halsey LLP

(57) ABSTRACT

A method of acquiring information about content includes the operations of receiving a video signal from an external apparatus connected to an image display apparatus, extracting an object included in an on screen display (OSD) image from an image that is produced using the video signal, and collecting the information about content by using the extracted object.

20 Claims, 17 Drawing Sheets

(51) Int. Cl.
   *H04N 21/44*      (2011.01)
   *H04N 21/4545*    (2011.01)
   *H04N 21/482*     (2011.01)
   *G06K 9/32*       (2006.01)
   *G06F 17/30*      (2006.01)
   *G06K 9/46*       (2006.01)
   *H04N 21/81*      (2011.01)

(52) U.S. Cl.
   CPC ......... *G06K 9/46* (2013.01); *H04N 21/44008* (2013.01); *H04N 21/45452* (2013.01); *H04N 21/482* (2013.01); *H04N 21/8146* (2013.01)

(56) References Cited

U.S. PATENT DOCUMENTS

| | | |
|---|---|---|
| 2008/0204595 A1 | 8/2008 | Rathod et al. |
| 2008/0244637 A1 | 10/2008 | Candelore |
| 2008/0303942 A1 | 12/2008 | Chang et al. |
| 2010/0057692 A1 | 3/2010 | Yoon et al. |
| 2010/0104184 A1 | 4/2010 | Bronstein |
| 2011/0067060 A1 | 3/2011 | Karaoguz |
| 2011/0138416 A1 | 6/2011 | Kang et al. |
| 2012/0086857 A1 | 4/2012 | Kim |
| 2014/0250457 A1 | 9/2014 | Ramaswamy |
| 2014/0278845 A1 | 9/2014 | Teiser |
| 2014/0282669 A1 | 9/2014 | McMillan |
| 2015/0020094 A1 | 1/2015 | Moon |

FOREIGN PATENT DOCUMENTS

| | | |
|---|---|---|
| EP | 1768396 | 3/2007 |
| EP | 2330814 | 6/2011 |
| EP | 2523465 | 11/2012 |
| KR | 1999-011182 | 2/1999 |
| KR | 10-2009-0116512 | 11/2009 |
| KR | 10-2011-0117492 | 10/2011 |
| RU | 2419216 | 1/2010 |

OTHER PUBLICATIONS

Extended European Search Report dated Jan. 17, 2017 in European Patent Application No. 14834585.3.
U.S. Notice of Allowance dated Mar. 7, 2017 in U.S. Appl. No. 14/452,092.
U.S. Office Action dated Nov. 4, 2016 in U.S. Appl. No. 14/452,092.
U.S. Office Action dated May 6, 2016 in U.S. Appl. No. 14/452,092.
U.S. Office Action dated Nov. 16, 2015 in U.S. Appl. No. 14/452,092.
U.S. Appl. No. 14/452,092, filed Aug. 5, 2014, Gyu-tae Park et al., Samsung Electronics Co., LTD.
Russian Office Action dated Nov. 10, 2017 in Russian Patent Application No. 2015155549/07.
Chinese Office Action dated Apr. 3, 2018 in Chinese Patent Application No. 201480039928.9.

METHOD OF ACQUIRING INFORMATION ABOUT CONTENTS, IMAGE DISPLAY APPARATUS USING THE METHOD, AND SERVER SYSTEM FOR PROVIDING INFORMATION ABOUT CONTENTS

CROSS-REFERENCE TO RELATED APPLICATIONS

This application is a Continuation of U.S. patent application Ser. No. 14/452,092, filed on Aug. 5, 2014, which claims the benefit of Korean Patent Application No. 10-2013-0093340, filed on Aug. 6, 2013, in the Korean Intellectual Property Office, the disclosures of which are incorporated herein in their entirety by reference.

BACKGROUND

1. Field

One or more embodiments of the disclosed herein relate to a method of acquiring information about contents, an image display apparatus using the method, and a server system for providing information about contents.

2. Description of the Related Art

Several scientific techniques are combined in one electronic device with the development of science. Image displays, such as TVs, not only receive a broadcast signal from a broadcasting station and provide broadcasting, but also enable viewers to connect to the Internet, thereby supporting various services.

For example, recently developed smart TVs support a user-customized service function, a recommendation function, and the like. However, image displays need pieces of information about contents viewed by users, in order to utilize these functions and increase the reliability and accuracy thereof.

SUMMARY

One or more embodiments of the disclosure include a method of acquiring information about contents by using an on screen display (OSD) image, an image display apparatus using the method, and a server system for providing information about contents. Additional aspects will be set forth in part in the description which follows and, in part, will be apparent from the description, or may be learned by practice of the disclosed embodiments.

According to one or more embodiments of the disclosure, a method of acquiring information about content may include receiving a video signal from an external apparatus connected to an image display apparatus, extracting an object included in an on screen display (OSD) image from an image that is produced using the video signal, and collecting the information about content by using the extracted object.

The OSD image may be an image that represents pieces of information about a content of a current channel that are produced according to a channel zapping input, the extracted object may be a graphic user interface (GUI) of the image that represents the pieces of information of the content of the current channel, and the information about content may be information about a content provider that provides the content to the external apparatus.

The OSD image may be an image that represents pieces of information about a content of a current channel that are produced according to a channel zapping input, the extracted object may be at least one of a text, an image, and a video that are included in the image that represents the pieces of information about the content of the current channel, and the information about content may be at least one of the title of the content, the channel of the content, the broadcasting company of the content, and broadcasting information of the content.

The OSD image may be a menu image that represents the categories of contents that are supported by the image display apparatus, the extracted object may be a graphic user interface (GUI) of the menu image, and the information about content may be information about a content provider that provides the content to the external apparatus.

The OSD image may be a channel guide image that uses an electronic program guide (EPG), the extracted object may be a graphic user interface (GUI) of the channel guide image, and the information about content may be information about a content provider that provides the content to the external apparatus.

The OSD image may be a channel guide image that uses an electronic program guide (EPG), the extracted object may be at least one of a text, an image, and a video that are included in a location on the channel guide image where a cursor is placed, and the information about content may be at least one of the title of the content, the channel of the content, the broadcasting company of the content, and broadcasting information of the content.

The OSD image may be a booting progress image that is input to the image display apparatus when the external apparatus is booted, the extracted object may be at least one of a text, an image, and a video that are included in the booting progress image, and the information about content may be information about a content provider that provides the content to the external apparatus.

The object included in the OSD image may have different characteristics depending on the type of content provider who provides the content to the external apparatus. The OSD image may be produced according to a user command input performed by using at least one of a button of a remote controller, a motion of a user, and a voice of the user.

According to one or more embodiments of the disclosure, an image display apparatus for acquiring information about content may include an external apparatus interface that receives a video signal from an external apparatus, a display unit (display) that displays an image that is produced using the video signal, an object extraction unit (object extractor) that extracts an object included in an on screen display (OSD) image from the image that is produced using the video signal, and a control unit (controller) that collects the information about content by using the extracted object.

The OSD image may be an image that represents pieces of information about a content of a current channel that are produced according to a channel zapping input, the extracted object may be a graphic user interface (GUI) of the image that represents the pieces of information of the content of the current channel, and the information about content may be information about a content provider that provides the content to the external apparatus.

The OSD image may be an image that represents pieces of information about a content of a current channel that are produced according to a channel zapping input, the extracted object may be at least one of a text, an image, and a video that are included in the image that represents the pieces of information about the content of the current channel, and the information about content may be at least one of the title of the content, the channel of the content, the broadcasting company of the content, and broadcasting information of the content.

The OSD image may be a menu image that represents the categories of contents that are supported by the image display apparatus, the extracted object may be a graphic user interface (GUI) of the menu image, and the information about content may be information about a content provider that provides the content to the external apparatus.

The OSD image may be a channel guide image that uses an electronic program guide (EPG), the extracted object may be a graphic user interface (GUI) of the channel guide image, and the information about content may be information about a content provider that provides the content to the external apparatus.

The object extractor may include an OSD detector that detects the OSD image from the image that is produced using the video signal and an identifier that identifies the object included in the detected OSD image. The object extractor may further include a descriptor generator that produces a descriptor that describes the features of the identified object.

The image display apparatus may further include a network interface that transmits the descriptor to a server system having prepared pieces of comparative data stored therein and receives information about content determined by using comparative data corresponding to the descriptor from the server system.

According to one or more embodiments of the disclosure, a server system for providing information about content may include a first server that receives the features of an object extracted from an OSD image of an image that is produced by an image display apparatus, a second server that stores prepared pieces of comparative data, and a third server that compares the features of the object received from the first server with the pieces of comparative data stored in the second server and that ascertains the information about content by using comparative data corresponding to the features of the object. The first server may transmit the information about content to the image display apparatus.

The first server may receive a descriptor that describes the features of the object, the second server may store pieces of comparative data that include at least one descriptor for each of a plurality of content providers, and the third server may ascertain the information about content from the descriptor received by the first server and the descriptors included in the pieces of comparative data stored in the second server. The second server may periodically monitor an OSD image of each of a plurality of content providers to update the pieces of comparative data.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
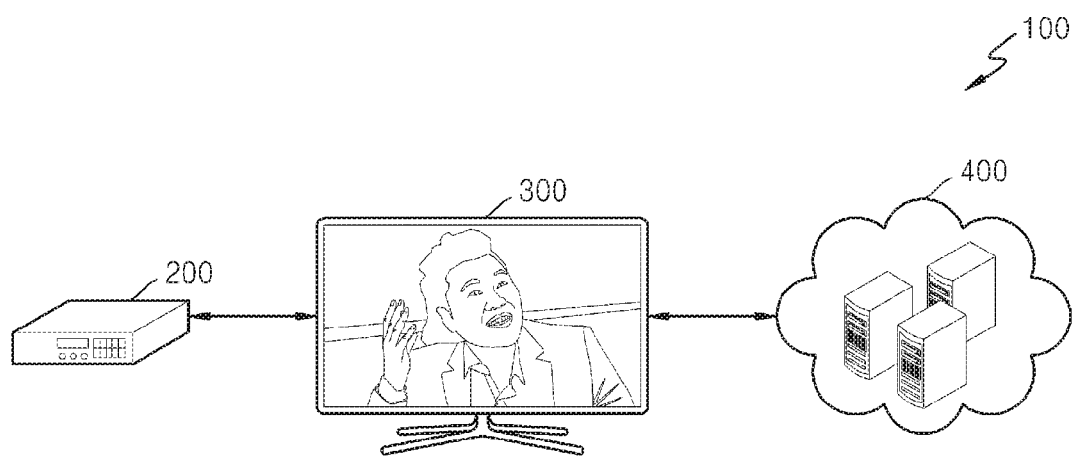
FIG. 1 illustrates a content providing system including an external apparatus, an image display apparatus, and a server system.

Reference will now be made in detail to embodiments, examples of which are illustrated in the accompanying drawings, wherein like reference numerals refer to like elements throughout. In this regard, the disclosed embodiments may have different forms and should not be construed as being limited to the descriptions set forth herein. Accordingly, the embodiments are merely described below, by referring to the figures, to explain aspects of the description. Expressions such as "at least one of," when preceding a list of elements, modify the entire list of elements and do not modify the individual elements of the list.

The below embodiments relate to a method of acquiring information about content, an image display apparatus using the method, and a server system for providing the information about contents, and a detailed description of matters well known to one of ordinary skill in the art to which the below embodiments pertain will be omitted.

FIG. 1 is a schematic diagram of a content providing system 100 that may include an external apparatus 200, an image display apparatus 300, and a server system 400. It will be understood by one of ordinary skill in the art related with the present embodiment that general-use components other than the components illustrated in FIG. 1 may be further included.

The external apparatus 200 may receive a content signal from a content provider, generate a content audio signal and a content video signal which are in a form executable by the image display apparatus 300, and provide the content audio signal and the content video signal to the image display apparatus 300. The external apparatus 200 may denote any kind of electronic apparatus that is connected to the image display apparatus 300 via wired or wireless communication (or a combination thereof) to transmit a video signal and an audio signal to the image display apparatus 300. For convenience of explanation, it is hereinafter assumed that the external apparatus 200 corresponds to a set top box that is connected as an external input to the image display apparatus 300.

The content signal received by the external apparatus 200 from a content provider may include broadcast signals produced by broadcasting companies and a signal about an additional service manufactured by the content provider. The content provider may be a cable TV broadcasting provider, an IPTV broadcasting provider, a satellite broadcasting provider, or the like. The content provider may receive broadcast signals from terrestrial broadcasting companies and other broadcasting companies and may re-transmit the received broadcast signals to the external apparatus 200. The content provider may also transmit a signal associated with an additional service such as a video-on-demand (VOD) service. In general, when a user makes a contract for subscription to a broadcasting service with a content provider, the external apparatus 200 is provided by the content provider or a company related with the content provider. Thus, different external apparatuses 200 may be provided according to different content providers. The broadcast signal and the signal associated with the additional service that are transmitted by the content provider to the external apparatus 200 may be processed differently depending on each content provider by the external apparatus 200 during audio and video processing. Consequently, the audio signal or video signal that is executed by the image display apparatus 300 may have different characteristics according to different content providers.

The image display apparatus 300 may receive the video signal or audio signal into which the content signal is processed by the external apparatus 200, and may provide sounds or images so that the user may enjoy the content. The image display apparatus 300 may be fixed or movable (portable). The image display apparatus 300 may include a terminal that enables video signal processing and has a display unit. Thus, the image display apparatus 300 may be a smart TV, a smart phone, a laptop, a tablet, a notebook computer, or the like. For convenience of explanation, it is hereinafter assumed that the image display apparatus 300 corresponds to a smart TV.

The image display apparatus 300 may collect information about content, for example, by using an on screen display (OSD) image that is included in an image produced by the image display apparatus 300 and is designed to have different characteristics according to different content providers. In more detail, the image display apparatus 300 may collect the information about content by using an object included in the OSD image. Since the signals received from the external apparatus 200 are the content audio signal and the content video signal and do not include the information about content, the image display apparatus 300 needs to acquire the information about content that is to be displayed on the image display apparatus 300. When knowing the information about content, the image display apparatus 300 may support various functions, and the convenience of users may increase.

The object included in the OSD image may be a Graphic User Interface (GUI) of the OSD image, or may be a text, an image, a video, or the like included in the OSD image. The information about content may denote content provider information, the title of the content, the channel of the content, the broadcasting company of the content, broadcasting information of the content, and the like.

The server system 400 may provide the information about content to the image display apparatus 300 and/or may provide the image display apparatus 300 with data that is necessary for obtaining the information about content. The server system 400 may also provide the image display apparatus 300 with data that is necessary for supporting services performed in the image display apparatus 300. For example, when the image display apparatus 300 supports a content suggestion service, the server system 400 may provide the image display apparatus 300 with information about content that is to be used in the content suggestion service, by using a database of pieces of data. The server system 400 may include one or a plurality of servers to perform different roles of the server system 400.

Figure 2:
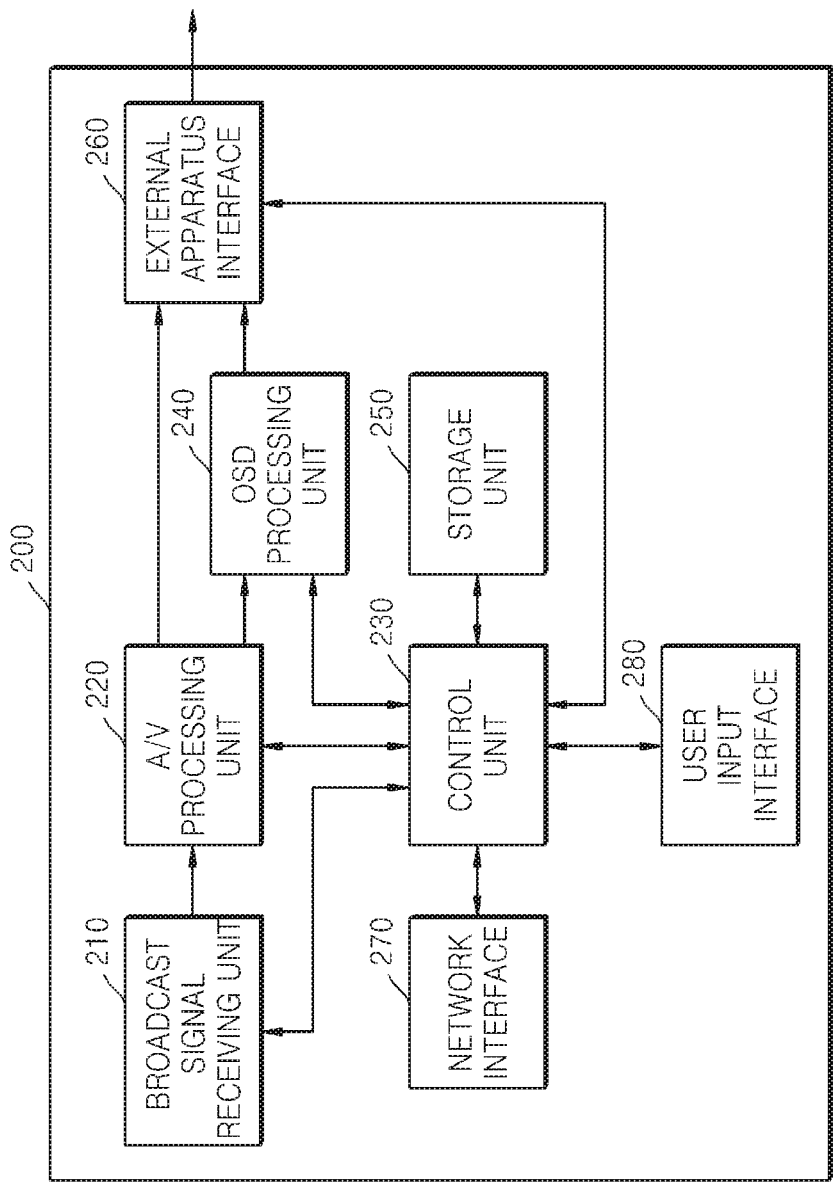
FIG. 2 is a block diagram of a structure of the external apparatus of FIG. 1.

FIG. 2 is a block diagram of a structure of the external apparatus 200 of FIG. 1. It will be understood by one of ordinary skill in the art related with the disclosed embodiment that general-use components other than the components illustrated in FIG. 2 may be further included.

Referring to FIG. 2, the external apparatus 200 may include a broadcast signal receiving unit 210 (receiver), an audio/video (A/V) processing unit 220 (A/V processor), a control unit 230 (controller), an OSD processing unit 240 (OSD processor), a storage unit 250 (storage), an external apparatus interface 260, a network interface 270, and a user input interface 280.

The external apparatus 200 may receive a content signal from the content provider and may process the content signal. The content signal may be broadcast signals produced by broadcasting companies and signals about additional services manufactured by the content provider.

The broadcast signal receiving unit 210 may include a tuner unit (not shown) (tuner) and a demodulation unit (not shown) (demodulator). The broadcast signal receiving unit 210 may receive a broadcast signal via an antenna. The broadcast signal receiving unit 210 may output the broadcast signal to the A/V processing unit 220.

The A/V processing unit 220 may perform signal processing on the received signal. For example, the A/V processing unit 220 may perform demultiplexing, decoding, or the like on a received audio signal, and may perform demultiplexing, decoding, or the like on a received video signal. To this end, the A/V processing unit 220 may include a transport stream (TS) decoder, a video decoder, and/or an audio decoder. An audio signal or a video signal obtained by the A/V processing unit 220 may be transmitted to the image display apparatus 300 via the external apparatus interface 260.

The control unit 230 may control an overall operation of the external apparatus 200. For example, the control unit 230 may control the tuner unit to tune a broadcast signal. The control unit 230 may control the external apparatus 200 according to a user command received via the user input interface 280 or programs and data stored in the storage unit 250. The control unit 230 may receive a content signal and data via the network interface 270.

The OSD processing unit 240 may mix an OSD image signal with the video signal obtained by the A/V processing unit 220. To this end, the OSD processing unit 240 may include an OSD producing unit (not shown) (OSD generator) and a mixer (not shown).

The OSD producing unit may produce the OSD image signal according to a user input or in consideration of a broadcast signal and an additional service signal. The OSD producing unit may produce an OSD image signal for displaying a variety of information in the form of a GUI, a text, an image, a video, or the like on the image display apparatus 300. The OSD image signal may be represented in various forms, such as an image representing pieces of content information of a current channel, various menu images, a channel guide image, a booting progress image, widgets, and icons, on the image display apparatus 300.

The mixer may mix the OSD image signal produced by the OSD producing unit with a decoded video signal obtained by the A/V processing unit 220. Each of the OSD image signal and the decoded video signal may include at least one of a 2D signal and a 3D signal.

The storage unit 250 may store a program for each signal processing performed in the AN processing unit 220 and a program for control and may also store a content signal and a variety of data received from the external apparatus interface 260 or the network interface 270. The storage unit 250 may also store data and a program that are used to produce the OSD image signal. For example, the storage unit 250 may be embodied as a storage medium, such as a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. However, examples of the storage are not limited to the above description, and the storage may be realized by other various devices and structures as would be understood by those skilled in the art.

The external apparatus interface 260 may provide a wired and/or wireless communication interface for data transmission or reception. In particular, the external apparatus interface 260 may provide an interface for processing the content signal received from the content provider and transmitting a content audio signal and a content video signal to the image display apparatus 300. The external apparatus interface 260 may receive data or various signals from the image display apparatus 300.

The network interface 270 may provide an interface for connection to a wired and/or wireless network including an Internet network. The network interface 270 may transmit or receive a content signal and data via a connected network or another network linked with the connected network. The network may include a local area network (LAN), wireless local area network (WLAN), wide area network (WAN), personal area network (PAN), virtual private network (VPN), or the like. For example, wireless communication between the external apparatus 200 and other elements of the example embodiments (e.g., the image display apparatus 300, content providers, broadcasting companies, etc.) may be performed via a wireless LAN, W-Fi, Bluetooth, Zigbee, W-Fi direct (WFD), ultra wideband (UWB), infrared data association (IrDA), Bluetooth low energy (BLE), near field communication (NFC), a radio frequency (RF) signal, and the like. For example, wired communication between the external apparatus 200 and other elements of the example embodiments (e.g., the image display apparatus 300, content providers, broadcasting companies, etc.) may be performed via a pair cable, a coaxial cable, an optical fiber cable, an Ethernet cable, and the like.

The user input interface 280 may transmit a user input signal to the control unit 230. For example, the user input interface 280 may receive a user input signal obtained due to manipulation of buttons, such as a power button, a channel button, a volume button, and an OK button, from a remote controller (not shown). The user input interface 280 may also include, for example, one or more of a keyboard, a mouse, a joystick, a switch, an electronic pen or stylus, a gesture recognition sensor (e.g., to recognize gestures of a user including movements of a body part), an input sound device or voice recognition sensor (e.g., a microphone to receive a voice command), a track ball, a remote controller, a smart phone, a tablet PC, a pedal or footswitch, a virtual-reality device, and so on. The user input interface 280 may further include a haptic device to provide haptic feedback to a user. The user input interface 280 may also include a touch screen, for example.

Figure 3:
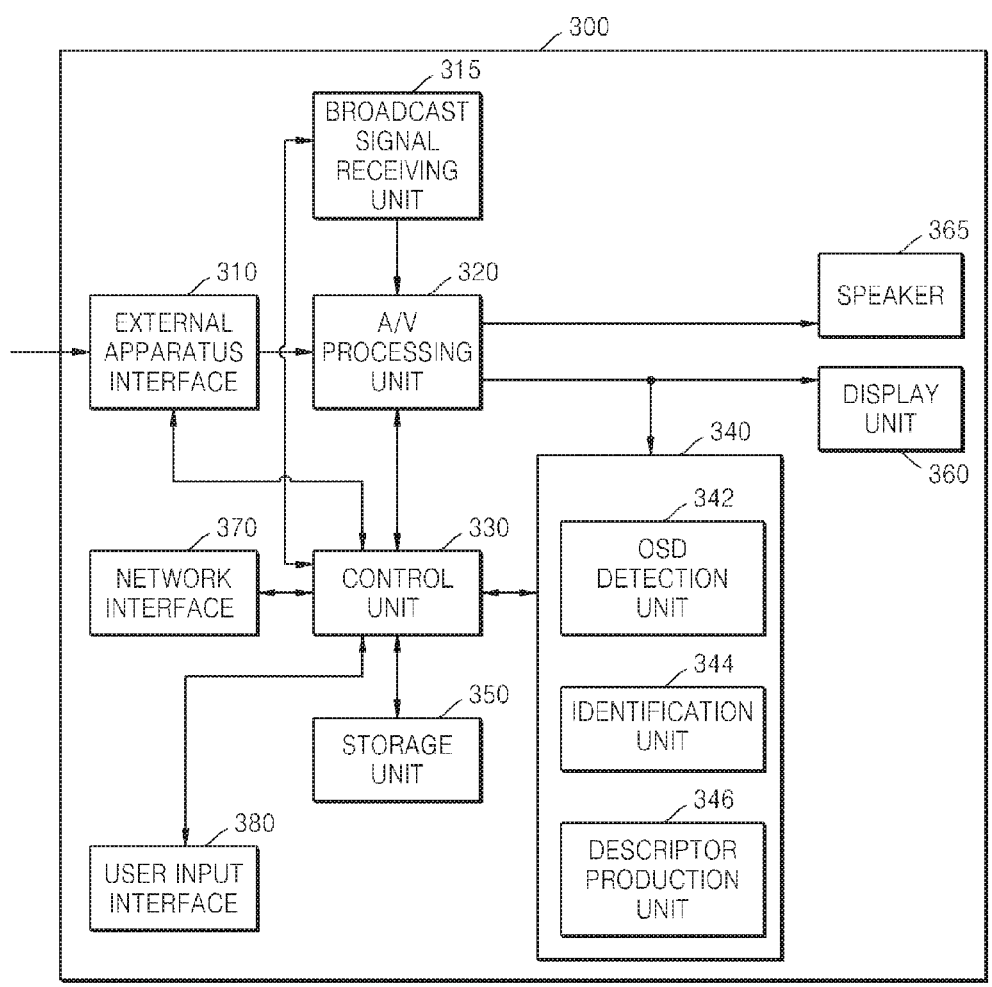
FIG. 3 is a block diagram of a structure of an image display apparatus according to an embodiment of the disclosure.

FIG. 3 is a block diagram of a structure of the image display apparatus 300 of FIG. 1, according to an embodiment of the disclosure. It will be understood by one of ordinary skill in the art related with the disclosed embodiment that general-use components other than the components illustrated in FIG. 3 may be further included. Components illustrated in FIG. 3 may be combined or omitted according to the specifications of the image display apparatus 300 when being actually implemented, or additional components may be included in the block diagram of FIG. 3. In other words, two or more components may be combined into a single component, or a single component may be divided into two or more components. A function performed in each block is only an example to explain an embodiment of the disclosure, and a detailed operation or device of each block does not limit the scope of the disclosure.

Referring to FIG. 3, the image display apparatus 300 may include an external apparatus interface 310, a broadcast signal receiving unit 315 (receiver), an A/V processing unit 320 (A/V processor), a control unit 330 (controller), an object extraction unit 340 (object extractor), a storage unit 350 (storage), a display unit 360 (display), a speaker 365, a network interface 370, and a user input interface 380. The object extraction unit 340 may include an OSD detection unit 342 (OSD detector), an identification unit 344 (identifier), and a descriptor production unit 346 (descriptor generator).

The external apparatus interface 310 may transmit or receive an audio signal and a video signal to or from the external apparatus 200 connected to the image display apparatus 300. To this end, the external apparatus interface 310 may include an A/V signal input/output unit (not shown) or a wireless communication unit (not shown). The external apparatus interface 310 may be connected to the external apparatus 200, such as a digital versatile disk (DVD), a Blu ray, a game player, a camera, a camcorder, a computer (e.g., a notebook), or a set-top box, by a wired or wireless connection or a combination thereof. The external apparatus interface 310 may receive a signal from the external apparatus 200 or output a signal to the external apparatus 200. The A/V signal input/output unit may receive an audio signal and/or a video signal from the external apparatus 200. The wireless communication unit may perform local-distance wireless communication with another electronic apparatus.

The broadcast signal receiving unit 315 may include a tuner unit (not shown) (tuner) and a demodulation unit (not shown) (demodulator). The tuner unit may select a radio frequency (RF) broadcast signal corresponding to a channel selected by a user or to all stored channels from among RF broadcast signals received via an antenna. The selected RF broadcast signal may be transformed into an intermediate frequency signal or a baseband video or audio signal. For example, when the selected RF broadcast signal is a digital broadcast signal, it may be transformed into a digital intermediate frequency (DIF) signal. When the selected RF broadcast signal is an analog broadcast signal, it may be transformed into an analog baseband video or audio signal (e.g., CVBS/SIF). In other words, the tuner unit may process a digital broadcast signal or an analog broadcast signal. The analog baseband video or audio signal (e.g., CVBS/SIF) output by the tuner unit may be directly input to the A/V processing unit 320.

The tuner unit may receive a single-carrier RF broadcast signal based on an Advanced Television System Committee (ATSC) method or a multi-carrier RF broadcast signal based on a Digital Video Broadcasting (DVB) method, for example.

The tuner unit may sequentially select RF broadcast signals of all broadcasting channels stored via a channel memorize function from among the RF broadcast signals received via an antenna, and may transform the selected RF broadcast signal into an IF signal or a baseband video or audio signal.

The tuner unit may include a plurality of tuners in order to receive broadcast signals corresponding to a plurality of channels. Alternatively, the tuner unit may include a single tuner capable of simultaneously receiving broadcast signals of a plurality of channels.

The demodulation unit may receive a DIF signal obtained by the tuner unit and may demodulate the DIF signal. The demodulation unit may perform demodulation and channel decoding to output a stream signal. The stream signal may be a TS signal obtained by multiplexing a video signal, an audio signal, or a data signal. The stream signal output by the demodulation unit may be input to the A/V processing unit 320.

Alternatively, the image display apparatus 300 may receive a content audio signal and/or a content video signal via only the external apparatus interface 310a and the network interface 370, without including the tuner unit and the demodulation unit.

The A/V processing unit 320 may perform demultiplexing, A/V signal processing, and the like and may output an image to the display unit 360 and a sound to the speaker 365. In other words, the A/V processing unit 320 may demultiplex a stream received via the external apparatus interface 310 or the broadcast signal receiving unit 315 or process demultiplexed signals, to thereby generate and output a signal for outputting an image or a sound.

A video signal obtained by the A/V processing unit 320 may be input to the display unit 360 so that an image corresponding to the video signal is displayed. An audio signal obtained by the A/V processing unit 320 may be output to the speaker 365 so that a sound corresponding to the audio signal is provided.

The video signal or audio signal obtained by the A/V processing unit 320 may be transmitted to an external apparatus via the external apparatus interface 310.

The control unit 330 may control an overall operation of the image display apparatus 300. For example, the control unit 330 may control the tuner unit to tune an RF broadcast corresponding to a channel selected by a user or to a pre-stored channel. The control unit 330 may also control the image display apparatus 300 according to a user command received via the user input interface 380 or a program and data stored in the storage unit 350. The control unit 330 may also control the display unit 360 to display an image. The image displayed on the display unit 360 may be a still image or a moving picture, and may be a 2D image or a 3D image. The control unit 330 may perform data communication with one or more apparatuses on a network, via the network interface 370. The control unit 330 may recognize a user or his or her location (or, for example, a plurality of users and the locations corresponding to each user), based on an image captured by a photographing unit (not shown) (e.g., a camera). For example, the control unit 330 may figure out (determine or calculate) a distance between the user and the image display apparatus 300 and may obtain a coordinate on the display unit 360 that corresponds to the location of the user.

The control unit 330 may collect information about content by using an object extracted by the object extraction unit 340. In other words, the control unit 330 may collect the information about content by using an object identified by the object extraction unit 340 or a descriptor that describes the characteristics of the object. In other words, without a user's manual input of the information about recognized content, the image display apparatus 300 may automatically acquire the information about content.

For example, the control unit 330 may determine whether the object identified by the object extraction unit 340 is the GUI of an OSD image, or a text, an image, or a video on the OSD image, which provides information, figure out (determine) the meaning of the identified object to classify the identified object according to the title, channel, broadcasting company, and broadcasting information of content, and store the classified object in the storage unit 350.

In another example, the control unit 330 may alternatively or additionally collect the information about content by using the descriptor that is produced by the object extraction unit 340 and describes the characteristics of the identified object. The descriptor may represent at least one of the position, size, color, shape, and structure of the object. The control unit 330 may transmit the descriptor to a server system having prepared pieces of comparative data stored therein and may receive information about content figured out (determined) by using comparative data corresponding to the descriptor from the server system, via the network interface 370, thereby collecting information about content.

The control unit 330 may classify the collected information about content according to types and store the classified information about content in the storage unit 350.

The object extraction unit 340 may detect an OSD image signal corresponding to an OSD image that is to be displayed on the display unit 360, and may extract an object included in the OSD image from the OSD image signal. The object extraction unit 340 may include the OSD detection unit 342, the identification unit 344, and the descriptor production unit 346.

The OSD detection unit 342 may sense and detect the OSD image signal corresponding to the OSD image which is to be displayed on the display unit 360, from the video signal obtained by the A/V processing unit 320. In other words, the OSD detection unit 342 may identify only an OSD image signal from the video signal transmitted by the A/V processing unit 320 to the display unit 360. Since the video signal obtained by the A/V processing unit 220 of the external apparatus 200 is mixed with the OSD image signal by the OSD processing unit 240, the object extraction unit 340 of the image display apparatus 300 may sense and identify the OSD image signal from the video signal obtained by the A/V processing unit 320 of the image display apparatus 300. The OSD detection unit 342 may detect the OSD image signal by using video frames respectively produced before and after a user command input based on at least one of a button on a remote controller, a motion of a user, and a voice of the user. However, the OSD image signal is not removed from the video signal transmitted to the display unit 360.

The OSD detection unit 342 may classify the detected OSD image signal according to a predetermined criterion and may transmit the classified OSD image signal to the identification unit 344. The classification of the OSD detection unit 342 may be performed to increase the accuracy when the identification unit 344 identifies an object included in an OSD image from the OSD image signal. For example, the OSD detection unit 342 may classify the OSD image signal in consideration of a location on the display unit 360 where the OSD image is to be displayed or the value of the OSD image signal, and may transmit the classified OSD image signal to the identification unit 344.

The identification unit 344 may identify the object included in the OSD image which is to be displayed on the display unit 360, from the detected OSD image signal. The object included in the OSD image may be the GUI of the OSD image, or may be a text, an image, a video, or the like included in the OSD image. The identification unit 344 may identify the object by using a method, such as text recognition, image recognition, or pattern recognition. To achieve accurate identification, OSD image detection and identification of an object included in an OSD image may be repeated several times.

The object extraction unit 340 may further include the descriptor production unit 346. The descriptor production unit 346 produces or generates a descriptor that describes the characteristics of the identified object. When it is difficult to collect information about content by using the object identified by the identification unit 344, the information about content may be collected by comparing the identified object with a large number of various pieces of data. In this case, the information about content may be collected by using the descriptor that describes the characteristics of the identified object. In particular, in a case where the identified object is to be compared with a database of data or where pieces of data exist in the server system 400 outside the image display apparatus 300, the information about content may be collected using the descriptor that describes the characteristics of the identified object.

The descriptor produced by the descriptor production unit 346 may represent at least one of the position, size, color, shape, and structure of the object. For example, when the position of the identified object within the OSD image or the size, color, shape, and structure of the identified object is unusual, the information about content may be acquired using a descriptor that describes the characteristics of the object.

The storage unit 350 may store programs for signal processing and control performed in the image display apparatus 300, or may store data or information produced within the image display apparatus 300 and an audio signal or a video signal obtained by signal processing. The storage unit 350 may temporarily store a video signal, an audio signal, or pieces of data, which is received from the external apparatus interface 310 or the network interface 370. The storage unit 350 may also store pieces of information about content, which are collected by the control unit 330. For example, the storage unit 350 may be embodied as a storage medium, such as a nonvolatile memory device, such as a Read Only Memory (ROM), Programmable Read Only Memory (PROM), Erasable Programmable Read Only Memory (EPROM), and flash memory, a USB drive, a volatile memory device such as a Random Access Memory (RAM), a hard disk, floppy disks, a blue-ray disk, or optical media such as CD ROM discs and DVDs, or combinations thereof. However, examples of the storage are not limited to the above description, and the storage may be realized by other various devices and structures as would be understood by those skilled in the art.

The display unit 360 may display an image that is obtained from the video signal by the image display apparatus 300. The display unit 360 may include a plasma display panel (a PDP), a liquid crystal display (an LCD), an organic light emitting diode (an OLED) display, an active matrix organic light emitting diode (AMOLED), a flexible display, or the like, and may perform 3D display. The display unit 360 may be configured as (suitable for, capable of, adapted to, arranged to, operable to, etc.) a touch screen type, and thus may serve as an input device as well as an output device.

The speaker 365 may denote an audio output unit that outputs sounds to a user. The image display apparatus 300 may also include a microphone to receive or detect an input of sound from a user (e.g., to perform voice recognition). The microphone may be included in the user input interface 380, for example.

The network interface 370 may connect the image display apparatus 300 to a wired and/or wireless network including an Internet network. The image display apparatus 300 may be connected to the Internet via the network interface 370 to perform data communication with one or more remote apparatuses on a network. For example, the image display apparatus 300 may be connected to the server system 400 on a network by using the Internet so as to transmit and receive information about content or pieces of data. The network may include a local area network (LAN), wireless local area network (WLAN), wide area network (WAN), personal area network (PAN), virtual private network (VPN), or the like. For example, wireless communication between the image display apparatus 300 and other elements of the example embodiments (e.g., the external apparatus 200, server system 400, etc.) may be performed via a wireless LAN, Bluetooth, Zigbee, Wi-Fi direct (WFD), ultra wideband (UWB), infrared data association (IrDA), Bluetooth low energy (BLE), near field communication (NFC), a radio frequency (RF) signal, and the like. For example, wired communication between the image display apparatus 300 and other elements of the example embodiments (e.g., the external apparatus 200, server system 400, etc.) may be performed via a pair cable, a coaxial cable, an optical fiber cable, an Ethernet cable, and the like.

The user input interface 380 may sense a user input signal and may transmit the user input signal to the control unit 330. For example, the user input interface 380 may receive a user input signal obtained due to manipulation of buttons, such as, a power button, a channel button, a channel button, a volume button, and an OK button, from a remote controller (not shown), or may sense a gesture or a voice of a user corresponding to a power on/off operation, channel selection, volume control, content selection, or the like, and may transmit the user input signal to the control unit 330. An OSD image may be produced according to a user command input performed by using at least one of a button of a remote controller, a motion of a user, and a voice of the user. The user input interface 380 may also receive a command input by a user, for example, using one or more of a keyboard, a mouse, a joystick, a switch, an electronic pen or stylus, a gesture recognition sensor (e.g., to recognize gestures of a user including movements of a body part), an input sound device or voice recognition sensor (e.g., a microphone to receive a voice command), a track ball, a pedal or foot-switch, a virtual-reality device, and so on. The user input interface 380 may further include a haptic device to provide haptic feedback to a user. The user input interface 380 may also include a touch screen, for example. The remote controller may be a remote control manufactured by a manufacturer specifically for use with the image display apparatus, or may alternatively correspond to an electronic device which is configured to, suitable for, capable of, adapted to, arranged to, operable to, etc. use as a remote controller with the image display apparatus (e.g., a smart phone, a tablet PC, etc.).

The remote controller may transmit a user input to the user input interface 380. To this end, the remote controller may use Bluetooth, RF communication, infrared (IR) communication, Ultra Wideband (UWB), ZigBee, and the like. The remote controller may receive a video, audio, or data signal from the user input interface 380 and display an image or output a sound.

Figure 4A:
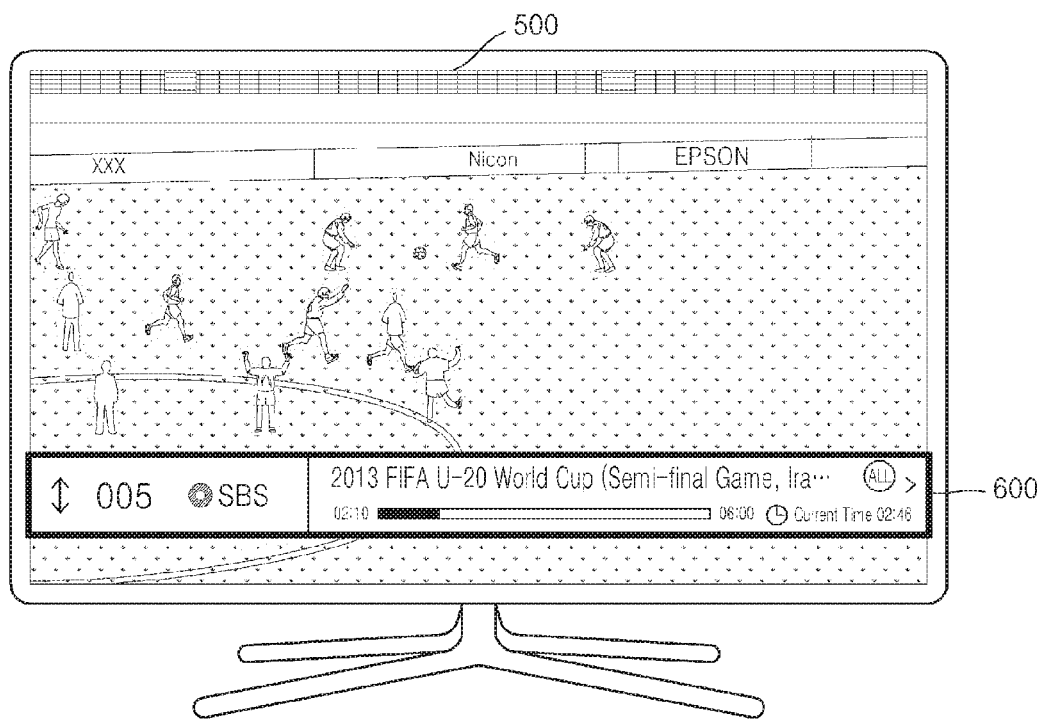
FIGS. 4A through 4C are views for explaining an on-screen display (OSD) image on an image produced by an image display apparatus.
Figure 4B:
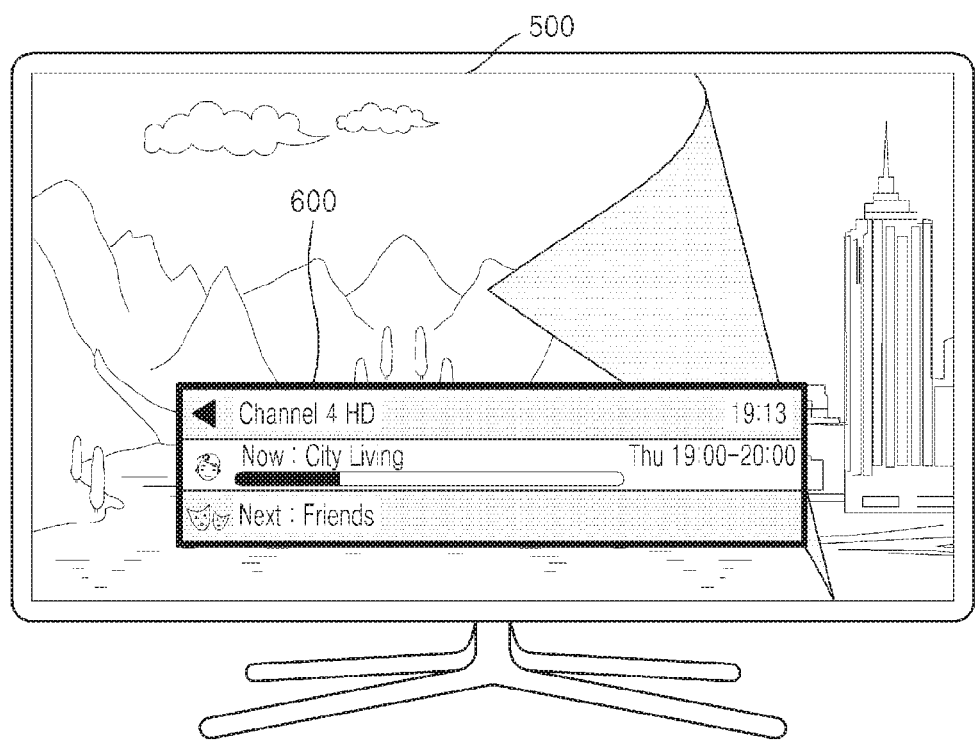
Figure 4C:
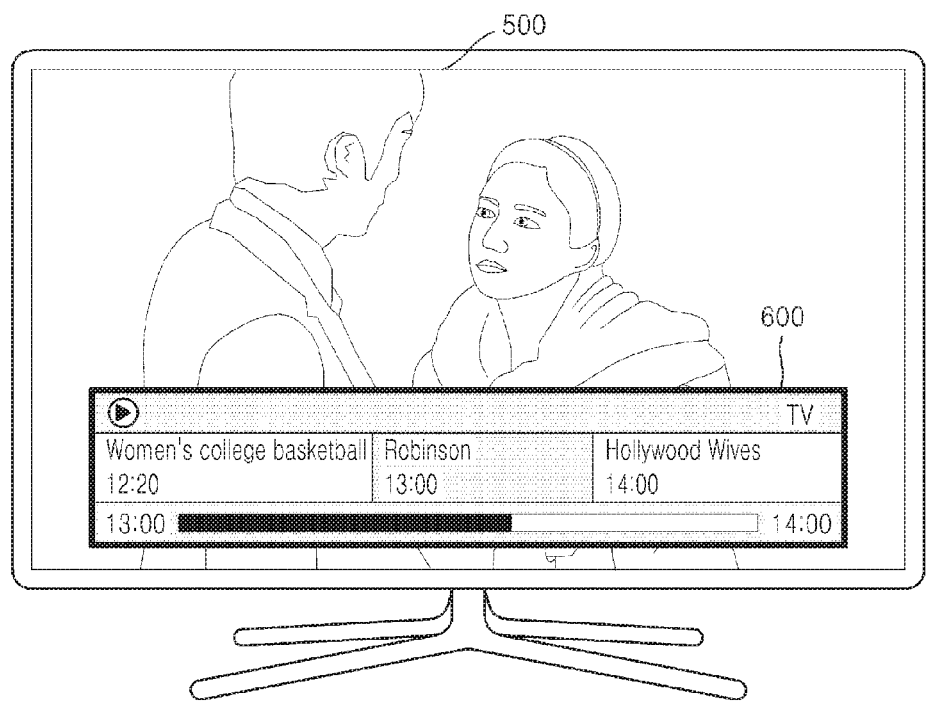

FIGS. 4A through 4C are views for explaining an OSD image in an image produced by an image display. FIGS. 4A, 4B, and 4C illustrate OSD images 600 having different characteristics, because the OSD images 600 and objects included in the OSD images 600 are designed to have different properties according to different content providers that provide content to an external apparatus.

Examples of the OSD images 600 may include various types of images that are displayed on the image display apparatus 300 together with or independently from a content image in order to allow users to use content more conveniently. The various types of images may be an image that represents pieces of content information of a current channel produced according to a channel zapping input (channel changing input), a menu image that represents the categories of a variety of content supported by an image display apparatus in order to help users to use the variety of content, and a channel guide image using an electronic program guide (EPG). Examples of the OSD images 600 also may include an image that is displayed on the image display apparatus 300 in a process for a user to use content, for example, a booting progress image input to the image display apparatus 300 when the external apparatus 200, which receives content from a content provider and provides a content video signal and a content audio signal in a form executable by the image display apparatus 300, is booted. The image display apparatus 300 may provide information about content by using the OSD images 600. Thus, when the image display apparatus 300 identifies an object from each OSD image 600, the image display apparatus 300 is able to be aware of information about content. In order to provide some of the services supported by the image display apparatus 300, the image display apparatus 300 may need to have information about content, such as a content provider or a content watching history. However, the image display apparatus 300 is able to automatically acquire the information about content, without a user's effort to manually input the information about content. It is further noted that OSD images may be displayed on the image display apparatus 300 together with a content image in a translucent/transparent manner and/or an opaque manner. When an OSD image is displayed on the image display apparatus 300 in a translucent/transparent manner, the content image may be viewed through the OSD image to allow users to use content more conveniently. On the other hand when an OSD image is displayed on the image display apparatus 300 in an opaque manner, content which may be behind the opaque OSD image may not be seen.

FIGS. 4A, 4B, and 4C illustrate OSD images 600 each representing pieces of content information of a current channel that are produced according to a channel zapping input. FIG. 4A illustrates an OSD image 600 displayed on the image display apparatus 300 together with an image 500 currently being broadcasted on a current channel, when a content provider is A. FIG. 4B illustrates an OSD image 600 displayed on the image display apparatus 300 together with an image 500 currently being broadcasted on a current channel, when a content provider is B. FIG. 4C illustrates an OSD image 600 displayed on the image display apparatus 300 together with an image 500 currently being broadcasted on a current channel, when a content provider is C.

Referring to the OSD image 600 of FIG. 4A, the GUI may be located on a lower part of the image 500 and extends from the left end of the image 500 to the right end thereof. In the GUI, the current channel, a broadcasting company of the currently-broadcasted content, the title of the currently-broadcasted content, broadcasting information of the currently-broadcasted content, and a current time may be displayed from left to right. It is seen that such information about the currently-broadcasted content may be included as an object such as a text, an image, or a video, within the GUI of the OSD image 600. It is also seen that a status bar may be displayed to indicate a length of the currently-broadcasted content, with a beginning time and an ending time of the currently-broadcasted content shown at corresponding ends of the status bar. The status bar may further indicate how far along the currently-broadcasted content is by shading/darkening/filling of the status bar.

Referring to the OSD image 600 of FIG. 4B, the GUI may be located on a lower part of the image 500 as in FIG. 4A, but does not extend from the left end of the image 500 to the right end thereof. Instead, the GUI is disposed in a central lower portion of the image 500. In the GUI, a current channel, a current time, the title of currently-broadcasted content, broadcasting information of the currently-broadcasted content, and the title of next content are displayed from top to bottom. It is seen that such information about the currently-broadcasted content may be included as an object such as a text, an image, or a video, within the GUI of the OSD image 600. It is also seen that a status bar may be displayed to indicate a length of the currently-broadcasted content, with a beginning time and an ending time of the currently-broadcasted content shown adjacent to the status bar. The status bar may further indicate how far along the currently-broadcasted content is by shading/darkening/filling of the status bar. A symbol or image may be shown adjacent to the currently-broadcasted content and next content to indicate or represent a genre or category of the content (e.g., comedy, drama, etc.).

Referring to the OSD image 600 of FIG. 4C, the GUI may be located on a lower part of the image 500 as in FIGS. 4A and 4B, but has an intermediate length between the lengths of the GUIs of FIGS. 4A and 4B. In the GUI, the title, time, and the broadcasting information of previous content, those of current content, and those of next content are sequentially displayed from left to right, and broadcasting information representing the degree to which the current content has been played is displayed on the lower part (e.g., in a status bar). It is seen that such information about content may be included as an object such as a text, an image, or a video, within the GUI of the OSD image 600. As noted above a status bar may be displayed to indicate or represent the degree to which the current content has been played and may be displayed below the broadcasting information of the previous content, current content, and next content. A beginning time and an ending time of the currently-broadcasted content may be shown at corresponding ends of the status bar and the status bar may indicate the degree to which the current content has been played by shading/darkening/filling of the status bar.

Although FIGS. 4A, 4B, and 4C illustrate the OSD images 600 each representing pieces of content information of a current channel produced according to a channel zapping input, it is seen that objects included in the OSD images 600 have different properties. In other words, it is seen that the objects, such as GUIs, texts, images, and videos, of the OSD images 600 may have different positions, sizes, colors, shapes, or structures, because different content providers provide OSD images 600 having different properties. Thus, information about content providers may be ascertained from the properties of the OSD images 600.

Figure 5:
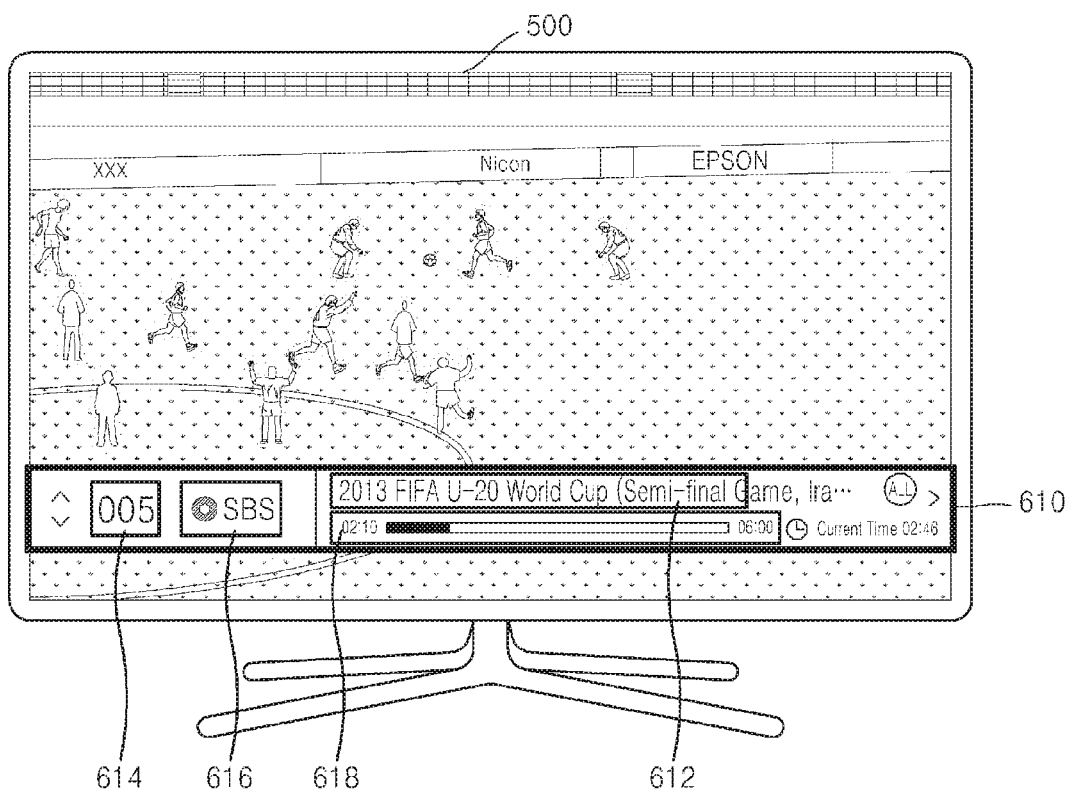
FIG. 5 is a view for explaining an OSD image and an object included in the OSD image.

FIG. 5 is a view for explaining an OSD image 610 and an object included in the OSD image 610. FIG. 5 illustrates the OSD image 610 displayed on the image display apparatus 300 together with an image 500 currently being broadcasted on a current channel. In particular, the OSD image 610 of FIG. 5 represents pieces of content information of a current channel that may be produced according to a channel zapping input.

Referring to the OSD image 610 of FIG. 5, the GUI may be located on a lower part of the image 500 and extends from the left end of the image 500 to the right end thereof. Several objects exist within the GUI of the OSD image 610. In an upper part of the center of the GUI, a title 612 of content currently being broadcasted on a current channel may be displayed as an object having a text form corresponding to a combination of numerals, characters, and symbols. In a left part of the GUI, a current channel 614 on which the current content is being broadcasted may be displayed as an object which is in a text form composed of a numeral. Next to the current channel 614, a broadcasting company 616 of the content being currently broadcasted on the current channel may be displayed as an object in a form of a combination of a figure image and an English character text. Below the title 612 of the content, broadcasting information 618 of the content being currently broadcasted on the current channel may be displayed as an object in the form of a combination of a bar image and a text composed of numerals and symbols. Thus, when the image display apparatus 300 identifies the objects displayed on the OSD image 610, the image display apparatus 300 may be able to be aware of (ascertain) information about the currently-broadcasted content.

Figure 6:
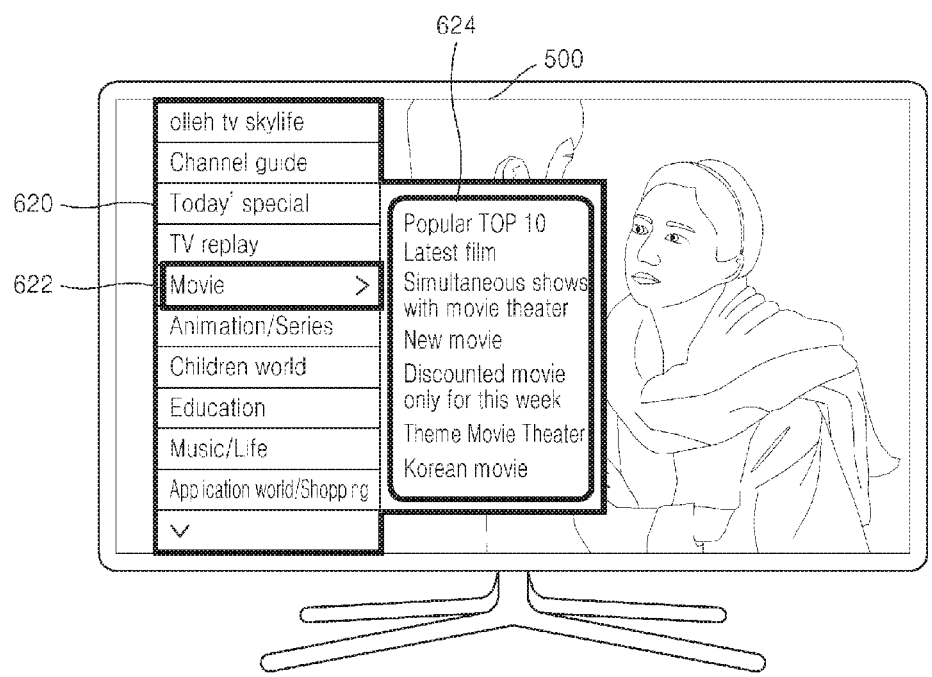
FIG. 6 is a view for explaining another OSD image and an object included in the OSD image.

FIG. 6 is a view for explaining another OSD image 620 and an object included in the OSD image 620. FIG. 6 illustrates the OSD image 620 displayed on the image display apparatus 300 together with an image 500 currently being broadcasted on a current channel. In particular, the OSD image 620 of FIG. 6 is a menu image that represents the categories of contents that are supported by an image display.

Referring to the OSD image 620 of FIG. 6, the GUI may be located on a left part of the image 500 and extends from the upper end of the image 500 to the lower end thereof. When a cursor 622 is located on a certain category on the OSD image 620, which represent the categories of the contents, detailed menus included in the category may be further displayed (e.g., in a pop-up form).

One or more objects may exist within the GUI of the OSD image 620. The titles of the contents may be displayed as objects in the form of a combination of numerals, characters, and symbols. Thus, when the image display apparatus 300 identifies the objects displayed on the OSD image 620, the image display apparatus 300 may be able to be aware of (ascertain) information about the contents. The above example OSD image of FIG. 6 is only an example, and the disclosure is not limited to the example of FIG. 6. For example, the OSD image of FIG. 6 may not extend to the upper and lower ends of image 500 and may be disposed between the upper and lower ends of image 500, or alternatively may be arranged in a horizontal manner between left and right ends of image 500.

Figure 7:
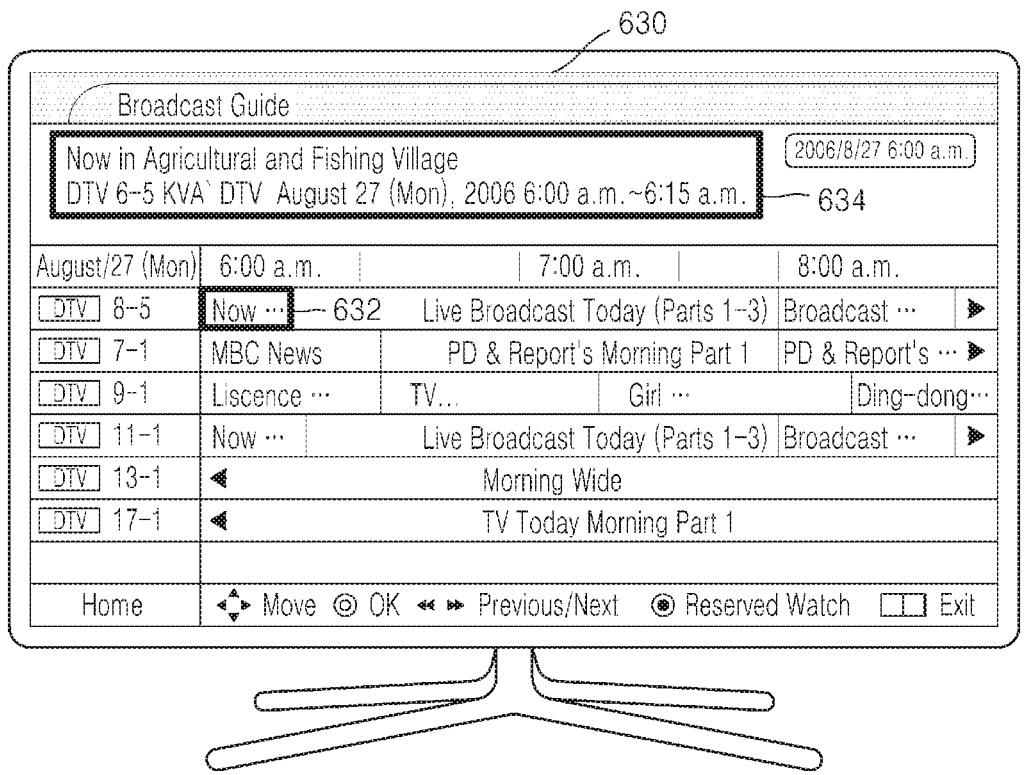
FIG. 7 is a view for explaining another OSD image and an object included in the OSD image.

FIG. 7 is a view for explaining another OSD image 630 and an object included in the OSD image 630. In FIG. 7, only the OSD image 630 is displayed on the image display apparatus 300. In particular, the OSD image 630 of FIG. 7 corresponds to a channel guide image using an EPG.

Referring to the OSD image 630 of FIG. 7, the GUI occupies the entire screen. Information about channels on which contents may be watched may be listed from top to bottom in the left part of the OSD image 630, which is for an EPG-based channel guide, and the titles of the contents may be listed from left to right in a time sequence so that viewers may check the broadcast starting time and the broadcast time period of each content. When a cursor 632 is moved to a certain content title on the OSD image 630, content information 634, such as the title, channel, broadcasting company, and broadcasting information of a corresponding content, may be displayed on an upper part of the OSD image 630. For example, as shown in FIG. 7, the cursor 632 is moved to a content whose title is shown in the upper part of the OSD image 630 and the content information 634 shown in the upper part of the OSD image 630 includes more information than that shown in the lower part which displays less information (e.g., a portion of the title, only the title of the content, etc.) A content to which the cursor has been moved to may be highlighted, a border thereof may be in bold, a color thereof may be different or brighter from other contents, etc., to indicate that the cursor has been moved to the content. In the GUI of the OSD image 630, various types of objects exist, and pieces of information about contents may be displayed as an object in a text form corresponding to a combination of numerals, characters, and symbols. Services that may be immediately provided on the OSD image 630 may also be displayed as objects in the form of a combination of a figure and a text. Also, informational object may be shown in the OSD image to display commands which may be input by a user (e.g., movement symbols to instruct a user how to move the cursor, a symbol to instruct a user how to enter a command, how to move between channels, how to exit the menu, etc.). Thus, when the image display apparatus 300 identifies the objects displayed on the OSD image 630, the image display apparatus 300 may be able to be aware of (ascertain) information about the contents.

Figure 8:
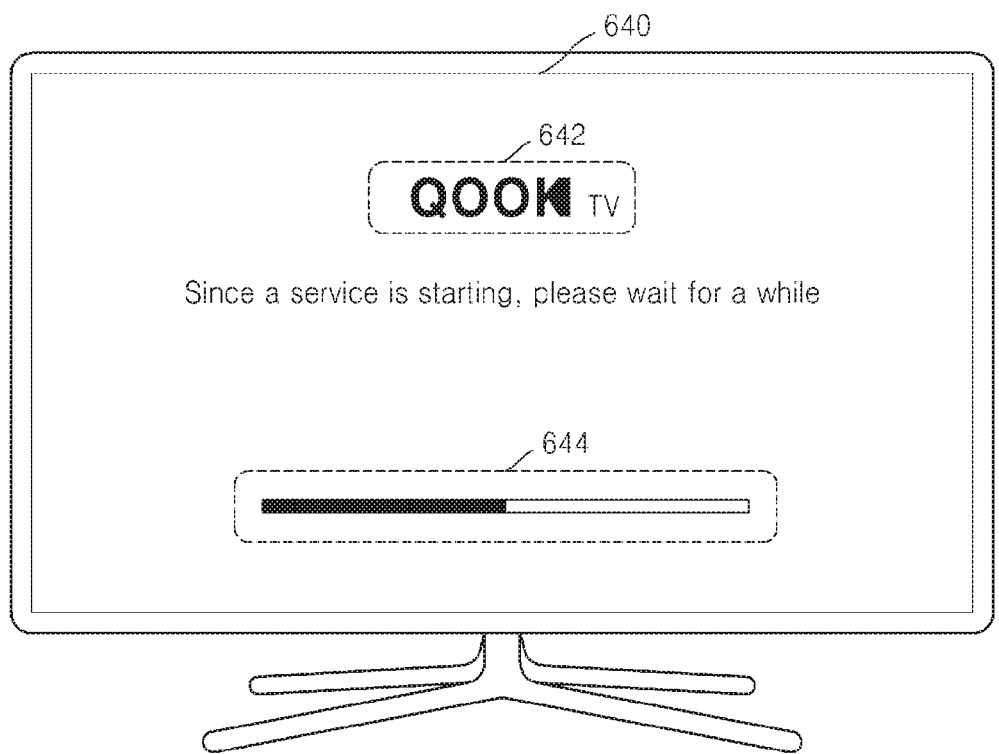
FIG. 8 is a view for explaining another OSD image and an object included in the OSD image.

FIG. 8 is a view for explaining another OSD image 640 and an object included in the OSD image 640. In FIG. 8, only the OSD image 640 may be displayed on the image display apparatus 300. In particular, the OSD image 640 of FIG. 8 may be a booting progress image 640 that is input to the image display apparatus 300 while the external apparatus 200 is being booted.

Referring to the OSD image 640 of FIG. 8, the GUI occupies the entire screen. An object 642 formed of a figure and a text to represent "QOOK TV" is displayed on an upper part of the booting progress image 640, which is input to the image display apparatus 300 during booting of the external apparatus 200. The term "QOOK TV" is the name of a representative content providing service provided by a Korean content provider KT. Thus, when the image display apparatus 300 identifies this text, the image display apparatus 300 is able to know (ascertain) who the content provider is. An object 644 in a video form representing a booting progress may be displayed on a lower part of the booting progress image 640, which is input to the image display apparatus 300 during booting of the external apparatus 200. In the GUI of the OSD image 640, various types of objects exist, and pieces of information about content are displayed as an object in the form of a combination of a text, such as characters, and symbols, and an image, such as a figure. Thus, when the image display apparatus 300 identifies the objects displayed on the OSD image 640, the image display apparatus 300 is able to be aware of (ascertain) the information about content. The above example OSD image of FIG. 8 is only an example, and the disclosure is not limited to the example of FIG. 8. For example, the objects shown in the OSD image of FIG. 8 may be disposed in other locations of the OSD image 640 (e.g., object 644 may be displayed on an upper part of the booting progress image 640 and object 642 may be displayed on a lower part of the booting progress image 640).

Figure 9:
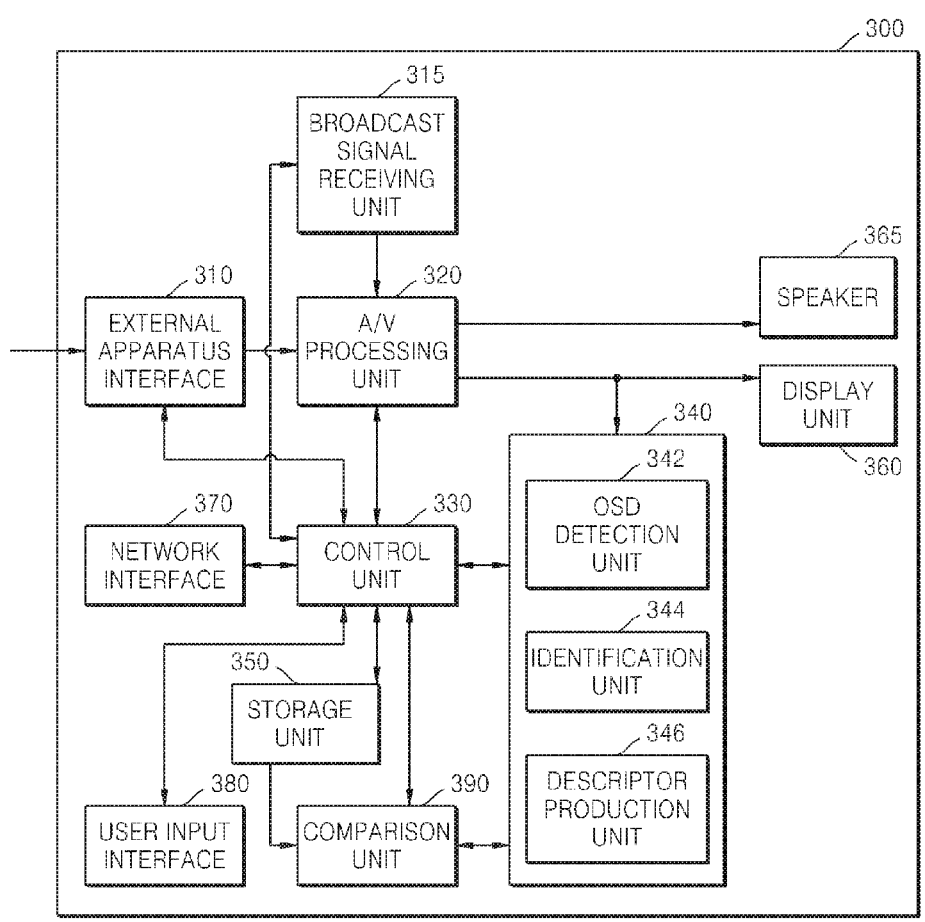
FIG. 9 is a block diagram of a structure of an image display apparatus according to another embodiment of the disclosure.

FIG. 9 is a block diagram of a structure of an image display apparatus 300 according to an embodiment of the disclosure. It will be understood by one of ordinary skill in the art related with the disclosed embodiment that general-use components other than the components illustrated in FIG. 9 may be further included.

Referring to FIG. 9, the image display apparatus 300 may include an external apparatus interface 310, a broadcast signal receiving unit 315 (receiver), an A/V processing unit 320 (A/V processor), a control unit 330 (controller), an object extraction unit 340 (object extractor), a storage unit 350 (storage), a display unit 360 (display), a speaker 365, a network interface 370, a user input interface 380, and a comparison unit 390 (comparator). The object extraction unit 340 may include an OSD detection unit 342 (OSD detector), an identification unit 344 (identifier), and a descriptor production unit 346 (description generator). Aspects of the image display apparatus 300 of FIG. 9 may be considered the same as that of FIG. 3 except for the comparison unit 390 which is further included. Descriptions of the components having the same names as those of FIG. 3 will be omitted, and the image display apparatus 300 of FIG. 9 will now be described by focusing on the comparison unit 390.

As described above with reference to FIG. 3, the control unit 330 may collect information about content by using an object extracted by the object extraction unit 340. In other words, the control unit 330 may collect the information about content by using an object identified by the object extraction unit 340 or a descriptor that describes the characteristics of the object. In other words, the control unit 330 may determine whether the object identified by the object extraction unit 340 is the GUI of an OSD image, or a text, an image, or a video on the OSD image, which provides information, and the control unit 330 may figure out (determine or ascertain) the meaning of the identified object to thereby collect the title, channel, broadcasting company, and broadcasting information of content. As described above, the control unit 330 may transmit a descriptor, which is produced by the object extraction unit 340 and describes the characteristics of an object, to a server system having prepared pieces of comparative data stored therein, and may receive information about content figured (determined) out by using comparative data corresponding to the descriptor from the server system, via the network interface 370, thereby collecting information about content.

The image display apparatus 300 of FIG. 3 further may include the comparison unit 390. In this case, the image display apparatus 300 may directly collect the information about content by using the descriptor describing the characteristics of objects. To this end, the control unit 330 may receive pieces of prepared comparative data from the server system 400 via the network interface 370 and may store the pieces of comparative data in the storage unit 350. The comparison unit 390 may compare the descriptor production unit 346 of the object extraction unit 340 with the pieces of comparative data stored in the storage unit 350 to find matched data, and may figure out (determine) the information about content from the matched data. The control unit 330 may collect this information about content. The control unit 330 may classify the collected information about content according to types and store the classified information about content in the storage unit 350.

Interactions with the server system 400 when the image display apparatus 300 acquires information about content will now be described.

Figure 10:
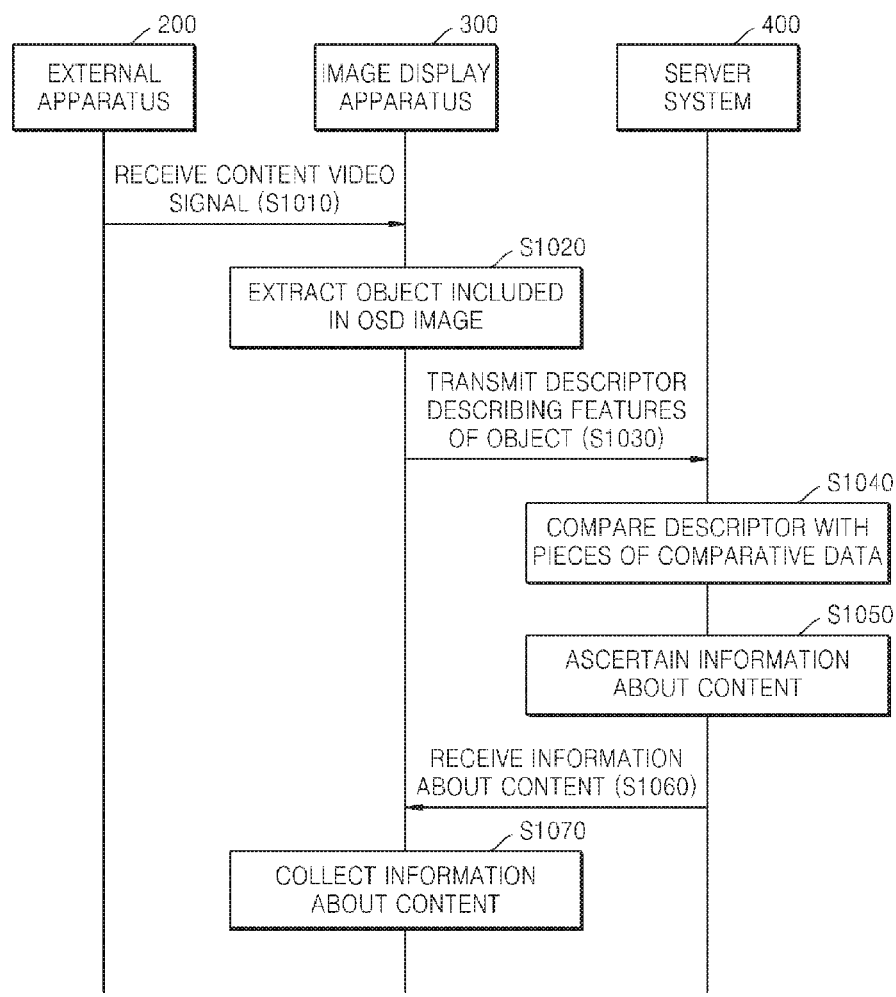
FIG. 10 is a flowchart of a process of acquiring information about contents in a content providing system including an external apparatus, an image display apparatus, and a server system.

FIG. 10 is a flowchart of a process of acquiring information about contents in the content providing system 100 including the external apparatus 200, the image display apparatus 300, and the server system 400.

In operation S1010, the image display apparatus 300 may receive a content video signal that is a result of a content signal being processed by the external apparatus 200 so as to have a form processible by the image display apparatus 300. The content video signal may include no information about content, namely, meta data.

In operation S1020, in order to acquire information about content, the image display apparatus 300 may detect an OSD image signal corresponding to an OSD image from a video signal obtained by video processing, and may extract an object included in the OSD image from the OSD image signal.

The image display apparatus 300 may determine whether the object identified by the object extraction unit 300 is the GUI of an OSD image, or a text, an image, or a video on the OSD image, which provides information, and figure out (determine) the meaning of the identified object to thereby collect the information about content, such as, for example, the title, channel, broadcasting company, and broadcasting information of content. Information about content that is difficult to collect by using an identified object may be ascertained by comparing a descriptor describing the features of the identified object with a database of pieces of data. The database of pieces of data may be previously prepared in the server system 400 outside the image display apparatus 300.

In operation S1030, the image display apparatus 300 may transmit a descriptor describing the features of an object to the server system 400 in order to ascertain the information about content by using pieces of comparative data prepared in the server system 400.

The server system 400 may include one or a plurality of servers to perform different roles of the server system 400.

A first server from among the servers may receive the features of the identified object included in the OSD image, from the image display apparatus 300. The first server may receive the features of the object in the form of a descriptor that describes the features of the object, from the image display apparatus 300.

A second server may store prepared pieces of comparative data. The pieces of data may have a form including at least one descriptor corresponding to each of a plurality of content providers or a form including at least one descriptor corresponding to each of different pieces of information about contents, and may create a database. Since the recentness of such pieces of comparative data increases the accuracy of acquiring content information, the second server may periodically monitor the OSD image of each content provider to update the pieces of comparative data. In other words, even when a content provider changes the features of an OSD image, an action to the change may be taken by the second server.

A third server may compare the features of an object received from the first server with the pieces of comparative data stored in the second server and may ascertain or determine the information about content from comparative data corresponding to the features of the object. In operations S1040 and S1050, the third server may search for descriptors corresponding to each other by using the descriptor received by the first server and the pieces of comparative data stored in the second server, and may ascertain the information about content, particularly, content provider information.

In operation S1060, the first server may transmit the information about content to the image display apparatus 300, and the image display apparatus 300 may receive the information about content.

Thus, the image display apparatus 300 may collect the information about content, in operation S1070.

When the server system 400 has no data corresponding to the descriptor transmitted by the image display apparatus 300, the image display apparatus 300 may display a user interface so that a user may manually input content information that the user knows. The server system 400 may produce comparative data indicating a descriptor about a new content provider from the descriptor received from the image display apparatus 300.

Figure 11:
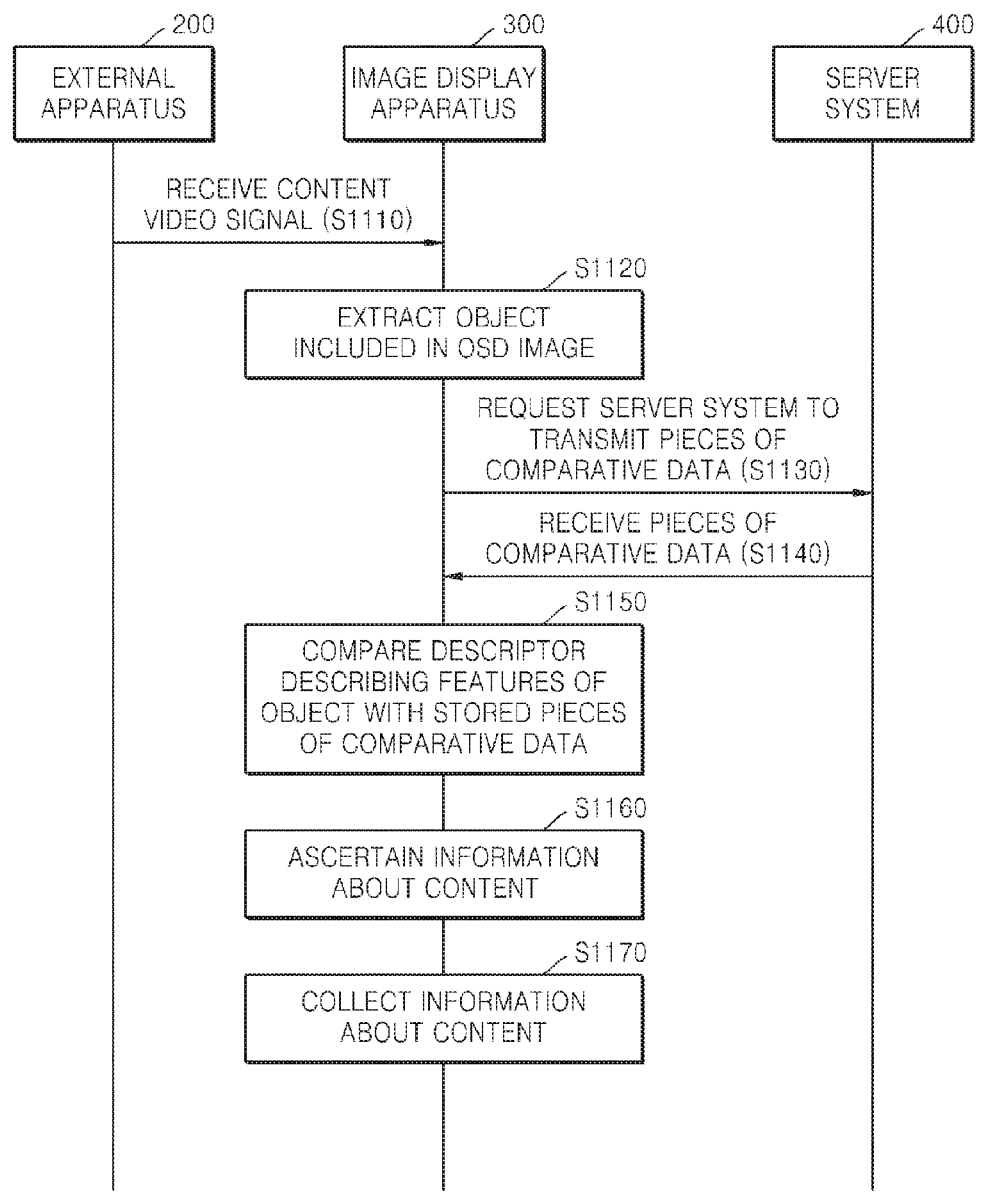
FIG. 11 is a flowchart of another process of acquiring information about contents in a content providing system including an external apparatus, an image display apparatus, and a server system.

FIG. 11 is a flowchart of another process of acquiring information about content in the content providing system including the external apparatus 200, the image display apparatus 300, and the server system 400. In FIG. 11, in contrast with FIG. 10, information about content may be ascertained by the image display apparatus 300 by using comparative data. As described above with reference to FIG. 9, the image display apparatus 300 further may include the comparison unit 390 in order to ascertain or determine the information about content. In an alternative embodiment, aspects of FIG. 10 and FIG. 11 may be combined. That is, some information about content may be obtained by the image display apparatus 300 by using comparative data based on objects extracted from an OSD image, and some information about content may be obtained by the server system 400 by using comparative data based on other objects extracted from the OSD image.

In operation S1110, the image display apparatus 300 may receive a content video signal that is a result of a content signal being processed by the external apparatus 200 so as to have a form processible by the image display apparatus 300. The content video signal may include no information about content, namely, meta data.

In operation S1120, in order to acquire information about content, the image display apparatus 300 may detect an OSD image signal corresponding to an OSD image from a video signal obtained by video processing, and may extract an object included in the OSD image from the OSD image signal.

The image display apparatus 300 may determine whether the object identified by the object extraction unit 300 is the GUI of an OSD image, or a text, an image, or a video on the OSD image, which provides information, and figure out (determine) the meaning of the identified object to thereby collect the information about content, such as, for example, the title, channel, broadcasting company, and broadcasting information of content. Information about content that is difficult to collect by using an identified object may be ascertained by comparing a descriptor describing the features of the identified object with a database of pieces of data. The database of pieces of data may be previously prepared in the server system 400 outside the image display apparatus 300.

In operation S1130, the image display apparatus 300 may request the server system 400 to transmit pieces of comparative data, in order to ascertain or determine the information about content by using the pieces of comparative data prepared in the server system 400.

In operation S1140, the image display apparatus 300 may receive the pieces of comparative data from the server system 400. The image display apparatus 300 may receive the prepared pieces of comparative data from the server system 400 and store the same.

Operations S1130 and S1140 may be performed in response to (after) receiving the content video signal at operation S1110 and the extracting of the object included in the OSD image at operation S1120. Alternatively, the image display apparatus 300 may request the server system to transmit the database of pieces of data or pieces of comparative data, independently of receiving a content video signal (e.g., before receiving a content video signal). Thus, in an alternative embodiment the image display apparatus 300 may receive and pre-store the database of pieces of data or pieces of comparative data, before receiving the content video signal.

Since the recentness of pieces of comparative data increases the accuracy of acquiring content information, the image display apparatus 300 may also periodically request the server system to transmit the database of pieces of data or pieces of comparative data so that the image display apparatus 300 receives and stores recent or updated pieces of comparative data. Accordingly, even when a content provider changes the features of an OSD image, the image display apparatus 300 may store recent or updated pieces of comparative data.

In operation S1150, the image display apparatus 300 may compare the descriptor describing the features of the object with the stored pieces of comparative data.

In operation S1160, the image display apparatus 300 may search for data matched with the descriptor from the pieces of comparative data and ascertain or determine the information about content.

In operation S1170, the image display apparatus 300 may collect this information about content.

Figure 12:
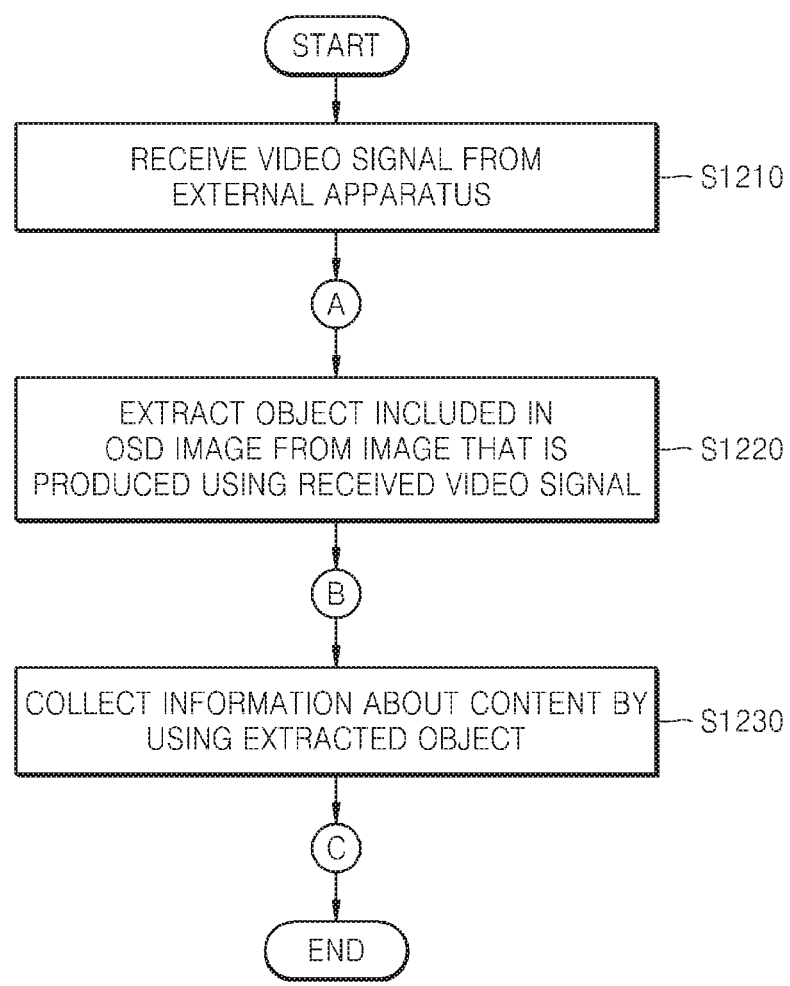
FIG. 12 is a flowchart of a method of acquiring information about contents, according to an embodiment of the disclosure.

FIG. 12 is a flowchart of a method of acquiring information about content, according to an embodiment of the disclosure. Matters described above in relation to the external apparatus 200, the image display apparatus 300, and the server system 400 even though descriptions thereof are omitted may be hereinafter applied to the method according to the disclosed embodiment.

In operation S1210, the image display apparatus 300 may receive a video signal from an external apparatus connected to the image display apparatus 300. The image display apparatus 300 may receive a content video signal that is a result of a content signal being processed by the external apparatus 200 so as to have a form processible by the image display apparatus 300. The content video signal may include no information about content, namely, meta data. Since the image display apparatus 300 does not receive information about content when receiving the content video signal, the image display apparatus 300 may need to acquire the information about content that is to be displayed on the image display apparatus 300. When knowing the information about content, the image display apparatus 300 may support various functions, and the convenience of users may increase.

In operation S1220, in order to acquire the information about content, the image display apparatus 300 may extract an object included in an OSD image from an image that is produced using the received content video signal.

Examples of the OSD images 600 may include various types of images that are displayed on the image display apparatus 300 together with or independently from a content image in order to allow users to use content more conveniently. The various types of images may be an image that represents pieces of content information of a current channel produced according to a channel zapping input, a menu image that represents the categories of a variety of content supported by an image display apparatus in order to help users to use the variety of content, and a channel guide image using an EPG. Examples of the OSD images 600 may also include an image that is displayed on the image display apparatus 300 in a process for a user to use content, for example, a booting progress image input to the image display apparatus 300 when the external apparatus 200, which receives content from a content provider and provides a content video signal and a content audio signal in a form executable by the image display apparatus 300, is booted. The image display apparatus 300 may provide information about content by using the OSD images 600. Thus, when the image display apparatus 300 identifies an object from each OSD image, the image display apparatus 300 may be able to be aware of (determine or ascertain) information about content.

The object included in the OSD image may be the GUI of the OSD image, or may be a text, an image, a video, or the like included in the OSD image.

The operation S1220 of extracting an object from an OSD image will now be described in greater detail with reference to FIG. 13.

Figure 13:
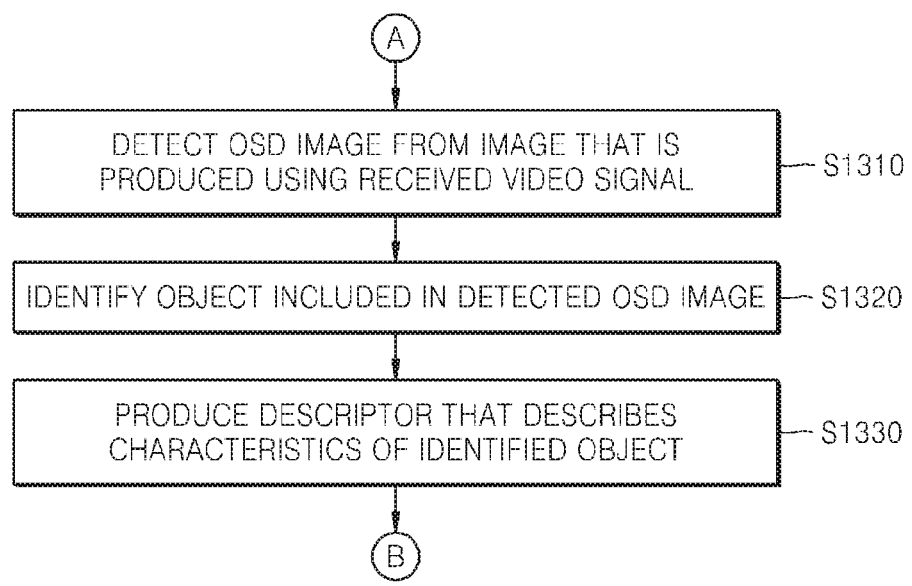
FIG. 13 is a flowchart of an operation of extracting an object from an OSD image, the operation included in the method of FIG. 12.

FIG. 13 is a flowchart of the operation S1220 of extracting an object from an OSD image.

In operation S1310, the image display apparatus 300 may detect an OSD image from an image that is produced using the received content video signal. The image display apparatus 300 may sense and detect an OSD image signal corresponding to an OSD image which is to be displayed on the display unit 360, from a video signal obtained by video processing.

In operation S1320, the image display apparatus 300 may identify an object included in the detected OSD image. The image display apparatus 300 may identify the object by using a method, such as text recognition, image recognition, or pattern recognition, for example.

In operation S1330, the image display apparatus 300 may produce or generate a descriptor that describes the characteristics of the identified object. The descriptor may represent at least one of the position, size, color, shape, and structure of the object included in the OSD image. These operations (the production or generation of one or more descriptors) may be performed selectively. That is, the production or generation of one or more descriptors for an identified object may be performed only when acquiring information about content by using the identified object is difficult or not possible.

Referring back to FIG. 12, the image display apparatus 300 may collect information about content by using the extracted object, in operation S1230. The information about content may denote content provider information, the title of the content, the channel of the content, the broadcasting company of the content, broadcasting information of the content, and the like. Various embodiments in which the image display apparatus 300 acquires or collects information about content will now be described with reference to FIGS. 14 through 16.

Figure 14:
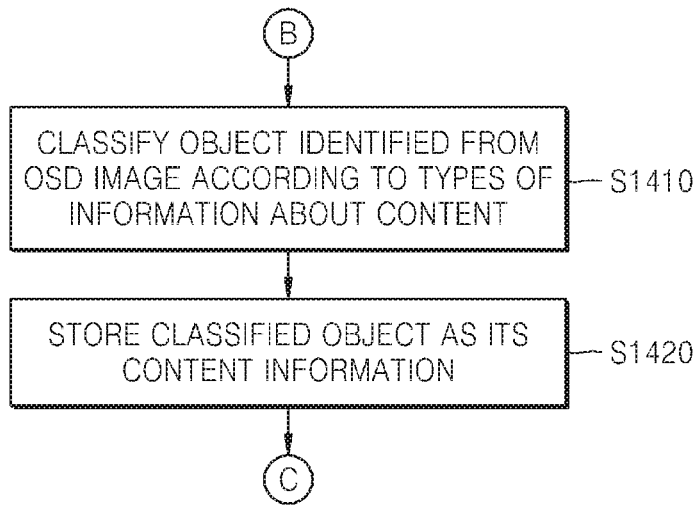
FIG. 14 is a flowchart of an operation of collecting information about contents, the operation included in the method of FIG. 12.

FIG. 14 is a flowchart of an operation of collecting information about contents, which is an embodiment of the operation S1230 of FIG. 12. The embodiment of FIG. 14 corresponds to a case where the information about content may be directly ascertained from an identified object.

In operation S1410, the image display apparatus 300 may classify an object identified from an OSD image according to types of information about content. The image display apparatus 300 may determine whether the identified object is the GUI of the OSD image, or a text, an image, or a video on the OSD image, which provides information, and figure out (determine) the meaning of the identified object to thereby classify the identified object according to the title, channel, broadcasting company, and broadcasting information of content and content provider information.

In operation S1420, the image display apparatus 300 may store the classified object as its content information.

Figure 15:
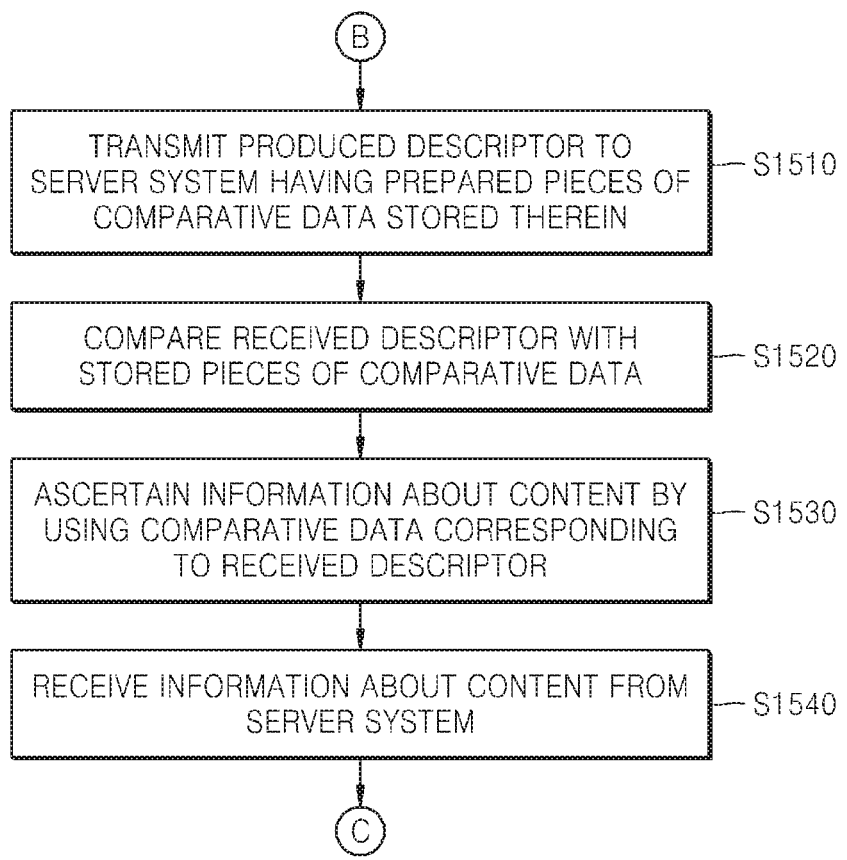
FIG. 15 is a flowchart of an operation of collecting information about contents, according to an embodiment of the disclosure.

FIG. 15 is a flowchart of an operation of collecting information about contents, which is an embodiment of the operation S1230 of FIG. 12. The disclosed embodiment corresponds to a case where the information about content is collected using a descriptor that describes the features of an identified object, particularly, a case where the server system 400 outside the image display apparatus 300 ascertains the information about content by using a descriptor.

In operation S1510, the image display apparatus 300 may produce or generate a descriptor describing the features of an identified object and may transmit the descriptor to the server system 400 having prepared pieces of comparative data stored therein.

In operation S1520, the server system 400 may compare the received descriptor with the stored pieces of comparative data.

In operation S1530, the server system 400 may ascertain or determine the information about content by using comparative data corresponding to the received descriptor.

In operation S1540, the image display apparatus 300 may receive the information about content from the server system 400.

Figure 16:
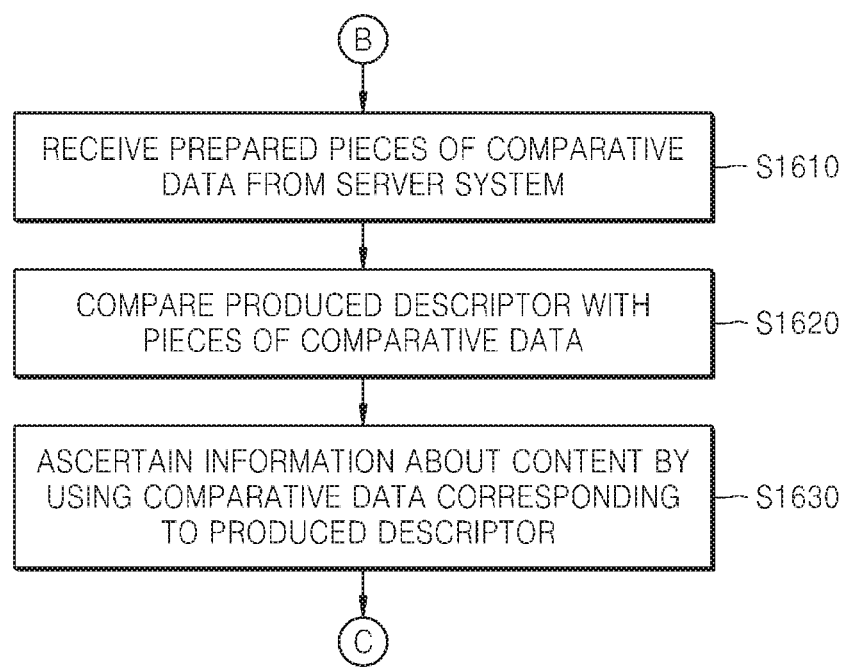
FIG. 16 is a flowchart of an operation of collecting information about contents, according to an embodiment of the disclosure.

FIG. 16 is a flowchart of an operation of collecting information about contents, which is an embodiment of the operation S1230 of FIG. 12. The disclosed embodiment corresponds to a case where the information about content is collected using a descriptor that describes the features of an identified object, particularly, a case where the image display apparatus 300 ascertains the information about content by using a descriptor.

In operation S1610, the image display apparatus 300 may receive prepared pieces of comparative data from the server system 400. When the image display apparatus 300 has already received pieces of comparative data from the server system 400, the operation S1610 may not be performed. However, to maintain the recentness of pieces of comparative data, the image display apparatus 300 may perform the operation S1610.

In operation S1620, the image display apparatus 300 a descriptor describing the features of an identified object may be compared the pieces of comparative data. When the pieces of comparative data from the server system 400 are already stored in the image display apparatus 300, the image display apparatus 300 may produce or generate a descriptor describing the features of an identified object, then make the comparison. Alternatively, the image display apparatus 300 may produce or generate a descriptor, then receive prepared pieces of comparative data from the server system 400, and afterward make the comparison.

In operation S1630, the image display apparatus 300 may ascertain or determine the information about content by using comparative data corresponding to the produced descriptor.

Compared with the method of collecting content information illustrated in FIG. 15, in the method of collecting content information illustrated in FIG. 16, if the image display apparatus 300 has already received recent pieces of comparative data from the server system 400, the image display apparatus 300 has no difficulty in collecting the information about content even when communication with the server system 400 is impossible. However, the number of data calculations to be performed by the image display apparatus 300 may increase, and thus a problem (e.g., a delay) may be generated in the image display apparatus 300.

As described above, according to the one or more of the above embodiments of the disclosure, when an image display apparatus acquires information about content, the image display apparatus may support various services, and the convenience of users may be increased.

The embodiments of the disclosure may be written as one or more computer programs and can be implemented in general-use digital computers that execute the programs using a computer readable recording medium (e.g., a non-transitory computer readable recording medium). Examples of the computer readable recording medium include magnetic storage media (e.g., ROM, floppy disks, hard disks, etc.), optical recording media (e.g., CD-ROMs, or DVDs), etc. The non-transitory computer-readable media may include program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

The apparatuses and methods according to the above-described example embodiments may use one or more processors. For example, a processing device may be implemented using one or more general-purpose or special purpose computers, and may include, for example, one or more of a processor, a controller and an arithmetic logic unit, a central processing unit (CPU), a graphics processing unit (GPU), a digital signal processor (DSP), a microcomputer, a field programmable array, a programmable logic unit, an application-specific integrated circuit (ASIC), a microprocessor or any other device capable of responding to and executing instructions in a defined manner.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

The exemplary embodiments should be considered in descriptive sense only and not for purposes of limitation. Descriptions of features or aspects within each embodiment should typically be considered as available for other similar features or aspects in other embodiments.

While the disclosure has been particularly shown and described with reference to exemplary embodiments thereof, it will be understood by those of ordinary skill in the art that various changes in form and details may be made therein without departing from the spirit and scope of the disclosure as defined by the following claims.

What is claimed is:

1. A method of acquiring information about content, the method comprising:
receiving a video signal from an external apparatus connected to an image display apparatus;
receiving comparative data from a server system;
extracting an object included in an on screen display (OSD) image from an image that is produced using the video signal;
producing a descriptor that describes the features of the extracted object; and
collecting the information about content by using the extracted object and by comparing the descriptor with the received comparative data.

2. The method of claim 1, wherein
the OSD image is an image that represents pieces of information about a content of a current channel that are produced according to a channel zapping input, the extracted object is a graphic user interface (GUI) of the image that represents the pieces of information of the content of the current channel, and the information about content is information about a content provider that provides the content to the external apparatus.

3. The method of claim 1, wherein the OSD image is an image that represents pieces of information about a content of a current channel that are produced according to a channel zapping input, the extracted object is at least one of a text, an image, and a video that are included in the image that represents the pieces of information about the content of the current channel, and the information about content is at least one of the title of the content, the channel of the content, the broadcasting company of the content, and broadcasting information of the content.

4. The method of claim 1, wherein the OSD image is a menu image that represents the categories of contents that are supported by the image display apparatus, the extracted object is a graphic user interface (GUI) of the menu image, and the information about content is information about a content provider that provides the content to the external apparatus.

5. The method of claim 1, wherein the OSD image is a channel guide image that uses an electronic program guide (EPG), the extracted object is a graphic user interface (GUI) of the channel guide image, and the information about content is information about a content provider that provides the content to the external apparatus.

6. The method of claim 1, wherein the OSD image is a channel guide image that uses an electronic program guide (EPG), the extracted object is at least one of a text, an image, and a video that are included in a location on the channel guide image where a cursor is placed, and the information about content is at least one of the title of the content, the channel of the content, the broadcasting company of the content, and broadcasting information of the content.

7. The method of claim 1, wherein the OSD image is a booting progress image that is input to the image display apparatus when the external apparatus is booted, the extracted object is at least one of a text, an image, and a video that are included in the booting progress image, and the information about content is information about a content provider that provides the content to the external apparatus.

8. The method of claim 1, wherein the object included in the OSD image has different characteristics depending on the type of content provider who provides the content to the external apparatus.

9. The method of claim 1, wherein the OSD image is produced according to a user command input performed by using at least one of a button of a remote controller, a motion of a user, and a voice of the user.

10. An image display apparatus for acquiring information about content, the image display apparatus comprising:

an communication interface;
a display;
a memory storing computer executable instructions;
a processor configured to process the computer executable instructions to at least:

control the communication interface to receive a video signal from an external apparatus and to receive comparative data from a server system;

control the display to display an image that is produced using the video signal;

extract an object included in an on screen display (OSD) image from the image that is produced using the video signal;

produce a descriptor that describes the features of the extracted object; and collect the information about content by using the extracted object and by comparing the descriptor with the received comparative data.

11. The image display apparatus of claim 10, wherein the OSD image is an image that represents pieces of information about a content of a current channel that are produced according to a channel zapping input, the extracted object is a graphic user interface (GUI) of the image that represents the pieces of information of the content of the current channel, and the information about content is information about a content provider that provides the content to the external apparatus.

12. The image display apparatus of claim 10, wherein the OSD image is an image that represents pieces of information about a content of a current channel that are produced according to a channel zapping input, the extracted object is at least one of a text, an image, and a video that are included in the image that represents the pieces of information about the content of the current channel, and the information about content is at least one of the title of the content, the channel of the content, the broadcasting company of the content, and broadcasting information of the content.

13. The image display apparatus of claim 10, wherein the OSD image is a menu image that represents the categories of contents that are supported by the image display apparatus, the extracted object is a graphic user interface (GUI) of the menu image, and the information about content is information about a content provider that provides the content to the external apparatus.

14. The image display apparatus of claim 10, wherein the OSD image is a channel guide image that uses an electronic program guide (EPG), the extracted object is a graphic user interface (GUI) of the channel guide image, and the information about content is information about a content provider that provides the content to the external apparatus.

15. The image display apparatus of claim 10, wherein the processor comprises:

a first processor that detects the OSD image from the image that is produced using the video signal; and a second processor that identifies the object included in the detected OSD image.

16. The image display apparatus of claim 15, wherein the processor further comprises third processor that produces the descriptor that describes the features of the identified object.

17. The image display apparatus of claim 16, further comprising a network interface that transmits the descriptor to the server system having prepared pieces of comparative data stored therein and receives information about content determined by using the comparative data corresponding to the descriptor from the server system.

18. A server system for providing information about content, the server system comprising:
- a first server that receives the features of an object extracted from an OSD image of an image and a descriptor that describes the features of the object that is produced by an image display apparatus;
- a second server that stores prepared pieces of comparative data; and
- a third server that compares the descriptor that describes the features of the object received from the first server with the pieces of comparative data stored in the second server to ascertain the information about content, wherein the first server transmits the information about content to the image display apparatus.

19. The server system of claim 18, wherein
the second server stores pieces of comparative data that include at least one descriptor for each of a plurality of content providers, and
the third server ascertains the information about content from the descriptor received by the first server and the descriptors included in the pieces of comparative data stored in the second server.

20. The server system of claim 18, wherein the second server periodically monitors an OSD image of each of a plurality of content providers to update the pieces of comparative data.

* * * * *